(12) United States Patent
Takaishi

(10) Patent No.: US 6,865,051 B2
(45) Date of Patent: Mar. 8, 2005

(54) HEAD POSITION CONTROL METHOD AND DISK STORAGE DEVICE

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 206 days.

(21) Appl. No.: 10/374,148

(22) Filed: Feb. 25, 2003

(65) Prior Publication Data

US 2003/0235002 A1 Dec. 25, 2003

(30) Foreign Application Priority Data

Jun. 19, 2002 (JP) .................................. 2002-178773

(51) Int. Cl.[7] .............................................. G11B 5/596
(52) U.S. Cl. .................... 360/77.04; 360/63; 360/78.04
(58) Field of Search ............................ 360/61–64, 75, 360/77.01–77.02, 77.04, 78.01, 78.04–78.07

(56) References Cited

U.S. PATENT DOCUMENTS 5,859,742 A * 1/1999 Takaishi .................. 360/78.01
5,995,316 A * 11/1999 Stich ...................... 360/77.04
6,421,200 B2   7/2002 Takaishi .................. 360/78.09
6,710,957 B2 * 3/2004 Nakasato .................... 360/51
6,728,061 B2 * 4/2004 Takaishi .................. 360/78.07
2001/0030828 A1 10/2001 Takaishi .................. 360/78.14

FOREIGN PATENT DOCUMENTS

JP   2000-021104   1/2000
JP   2001-283543   10/2001

* cited by examiner

Primary Examiner—Andrew L. Sniezek
Assistant Examiner—Jason Olson
(74) Attorney, Agent, or Firm—Greer, Burns & Crain, Ltd.

(57) ABSTRACT

A disk device has eccentric misalignment between a plurality of disk surfaces. In order to prevent transient phenomena due to differences in the eccentric trajectories during head switching, a head position control method performs feed forward control for a plurality of disk surfaces by application of the eccentricity correction current of respective heads, and when switching heads, predicts the velocity fluctuation or current step differential between heads from the eccentricity correction current, and thus corrects the control system to eliminate velocity fluctuation and current step differential.

16 Claims, 24 Drawing Sheets

ECCENTRIC COMPENSATING CURRENTS OF TWO RECORDING SURFACES

CURRENT CHANGE WHEN CHANGING HEAD

CURRENT CHANGE WHEN ADDING COMPENSATING CURRENT

STEP CORRECTION CURRENT USING A SECONDARY ORDER FUNCTION

STEP CORRECTION CURRENT USING SINE WAVE

US 6,865,051 B2

HEAD POSITION CONTROL METHOD AND DISK STORAGE DEVICE

BACKGROUND OF THE INVENTION

1. Field of the Invention

The present invention relates to a head position control method and disk storage device for controlling the position of a read head or read/write head on a rotating storage disk, and more particularly, to a head position control method and a disk storage device mounted with two or more heads.

2. Description of the Related Art

A disk storage device has a disk for storing data, a motor for rotating the disk, a head for recording and regenerating information onto the disk, and an actuator for moving the head to a target position on the disk. Typical disk storage devices of this kind are a magnetic disk device (hard disk drive, or HDD), or an optical disk device (DVD-ROM or MO).

FIG. 26 is a compositional diagram of a conventional head position control system, and FIG. 27 is an illustrative view describing the eccentricity of the disk. In a magnetic disk device, a positional signal for detecting the head position is recorded onto the disk. The positional signal is constituted by a servo mark and track number, and offset information. Using the track number and offset information, the present position of the head can be ascertained.

As shown in FIG. 26, the control system for controlling the head position according to the present position and the target position calculates the positional error (r−y) between the target position r and the present position y, in a calculator 106, and inputs same to a controller C. The controller C is constituted by a commonly known PID controller or observer, which calculates a current for eliminating the position error and outputs the same to a plant actuator P. The actuator P is driven and the present position y is output from the head provided on the actuator P.

Moreover, in order to follow disk eccentricity, an eccentricity correction current corresponding to the selected head (disk face) is output from a table 108 storing eccentricity correction currents for each head, and is added to the command current of the controller C and supplied to the plant P.

In other words, the controller C determines the differential between the positional information and the target position, performs a calculation according to the amount of positional deviation thereof, and supplies a drive amount for driving the actuator P, for example, a current in the case of a VCM (voice coil motor), or a voltage in the case of a piezo-electric actuator, or the like.

As illustrated in FIG. 27, in this disk device, eccentricity, in other words, misalignment between the disk center and the motor center causing the disk to rotate, causes a problem. More precisely, a problem is caused by misalignment between the rotational center when recording a servo signal onto the disk 110, 112, and the rotational center of the motor of the disk device. A servo signal is recorded respectively onto the disks 110 and 112. When this signal is recorded, the eccentricity between the two disks is "0".

However, misalignment of the two disks 110, 112 may cause these two disks 110, 112 to deviate from the rotational center of the motor, as illustrated in FIG. 27. A problem then arises in that the amount of such deviation will be different in the respective disks 110, 112. The cause of eccentricity of this kind may be from external shocks, thermal deformation, or the like. Moreover, in a system where the recording of the servo signal is performed on individual disks before assembling the device, whereupon the device is then assembled, eccentricity will invariably occur and the differential in eccentricity between disks will be large.

The differential in the eccentricity between disks means that when switching heads, the eccentricity following of the switched head is necessary. Conventionally, various types of techniques has been proposed in order to facilitate the operation of following eccentricity when switching heads.

For example, Japanese Laid-open Patent No. 2000-21104 proposes a method where, in the case of a device having eccentric misalignment between heads, an internal variable for generating an eccentricity correction current within a controller is changed when the head is switched. If an eccentricity correction control system such as that described in this example is applied, then it can be possible to suppress eccentricity, even in the case of a device having large eccentricity, and even if there is a differential in the amplitude and phase of the eccentricity between the inner and outer perimeters of the disk.

Moreover, Japanese Laid-open Patent No. 2001-283543, and others, propose a method for dealing with changes in the eccentricity and phase of the eccentricity correction current at the inner and outer perimeters occurring when the disk eccentricity is large.

Nevertheless, conventional technology, including the proposals described above, has been devised with respect to the current after head switching, or the positional error between heads. However, this technology does not take into account initial velocity or initial current immediately after head switching.

Initial velocity and initial current immediately after head switching are now described with reference to FIG. 28 and FIG. 29.

FIG. 28 shows an example where there is a differential in the eccentricity trajectory between head 0 and head 2, and depicts the movement of the servo signal on the face of a head 2 over a separate disk, while controlling the position of a head 0 over a certain track. In order to simplify the explanation, in FIG. 28, the face of head 0 will be assumed to have "0" eccentricity, and only the face of head 2 will be regarded as having eccentricity. The current, velocity, and position of the face of head 2 are thus depicted.

As shown in FIG. 28, the servo signal on the face of head 2 follows a sinusoidal trajectory having the same frequency as the rotational frequency, with respect to the servo signal on the face of head 0. A similar explanation can be used in cases where both sides of the disk have eccentricity. In this state, head switching is performed. As shown in FIG. 29, after switching heads, the eccentricity correction current is switched from eccentricity correction for the face of head 0 to eccentricity correction for the face of head 2. Thereby, a step of magnitude u0 is generated in the relative current U. Moreover, there will be an initial velocity of relative velocity V0 corresponding to the differential between the sinusoidal trajectories of head 0 and head 2. The relative position will also change by X0.

In the prior art, when switching heads, control of switching is performed by addressing only the relative position X0 or the eccentricity correction current themselves, as illustrated in FIG. 29. However, the current u0 and initial velocity V0 are not taken into account.

In the present invention, on the other hand, initially the existence of the initial velocity V0 is investigated. When switching heads, seek control is performed. However, in a conventional control system, it is assumed that the initial velocity at head switching is 0, or that it is the same as the velocity of the previous head. "Seek control" involves performing control in such a manner that the distance to the target position becomes "0" and the speed upon reaching the target position is also "0". However, since the initial speed is not "0", then a corresponding disparity occurs. This disparity creates a fluctuation upon arriving at the target position, and since this fluctuation takes time to be absorbed, it causes a lengthening of the seek time.

Next, there is the problem of the step u0 in the eccentricity correction current. If the differential in the eccentricity trajectory is large, then this step u0 will also be large. When switching heads, this sudden change in the current stimulates the resonance of the actuator, and is a cause of fluctuation. As a means of suppressing this resonance, a current is output to the actuator via a filter, such as a notch filter, or the like. However, even if several notch filters are used, the resonance frequency component cannot be reduced fully to zero, and the notch filter waveform cannot provide 100% correction of the actuator resonance characteristics. Consequently, if there is a sudden step in the initial current u0 as illustrated in FIG. 29, fluctuation may occur, which in turn becomes a cause of delay in the seek time.

Therefore, it is an object of the present invention to provide a head position control method and disk device for reducing lengthening of the seek time due to the initial velocity V0 upon switching heads.

It is a further object of the present invention to provide a head position control method and disk device for reducing lengthening of the seek time due to the initial current u0 upon switching heads.

Moreover, it is yet a further object of the present invention to provide a head position control method and disk device for recording or reproducing data by moving an actuator to a target position at higher speed, after switching heads.

SUMMARY OF THE INVENTION

In order to achieve the aforementioned objects, one aspect of the head position control method according to the present invention is a head position control method for driving a plurality of heads by a single actuator in order to at least read different disk faces, having the steps of: calculating a servo control amount in accordance with a positional error between a target position of the head and a present position of the head; controlling the actuator by adding an eccentricity correction current corresponding to a selected head of the plurality of heads to the servo control amount; calculating differential velocity between eccentric trajectories of the respective heads when switching from one of the plurality of heads to another of the plurality of heads; and setting the differential velocity as an initial velocity in the step of calculating the servo control amount.

Preferably, in the present invention, the step of calculating the differential velocity also has a step for calculating the differential velocity on the basis of a difference between the eccentricity correction current for the one head and the eccentricity correction current for the other head.

In this embodiment of the present invention, the initial velocity when switching heads is preferably predicted and supplied to a controller, thereby improving disparity in the response, and hence making it possible to shorten the seek time.

A further aspect of a head position control method according to the present invention is a head position control method for driving a plurality of heads by a single actuator in order to at least read different disk faces, having the steps of: calculating a servo control amount in accordance with the positional error between a target position of the head and a present position of the head; controlling the actuator by adding an eccentricity correction current corresponding to a selected head of the plurality of heads to the servo control amount; calculating a differential velocity between eccentric trajectories of the respective heads when switching from one of the heads to another of the heads; and performing feed forward control for reducing the differential velocity.

More preferably, the feed forward control step also has the steps of: generating a position trajectory and current trajectory for reducing the differential velocity in accordance with the differential velocity; correcting the present position by the position trajectory; and adding the current trajectory to the eccentricity correction current and supplying same to the actuator.

In this embodiment of the present invention, the initial velocity when switching heads is preferably predicted and the correction trajectory for correcting the initial velocity when switching is supplied to a system, thereby making it possible to shorten the seek time.

A further embodiment of a head position control method according to the present invention is a head position control method for driving a plurality of heads by a single actuator in order to at least read different disk faces, having the steps of: calculating a servo control amount in accordance with the positional error between a target position of the head and a present position of the head; controlling the actuator by adding an eccentricity correction current corresponding to a selected head of the plurality of heads to the servo control amount; calculating a differential between the eccentricity correction current for the head before switching and the eccentricity correction current for the head after switching when switching from one of the heads to another of the heads; and performing feed forward control for reducing the differential.

More preferably, the feed forward control step also includes the steps of: generating a position trajectory and current trajectory for reducing the current differential in accordance with the current differential; correcting the present position by means of the position trajectory; and adding the current trajectory to the eccentricity correction current and supplying same to the actuator.

According to this embodiment of the present invention, the switching step in the eccentricity correction current when switching heads is preferably predicted and supplied to a controller, thereby eliminating residual oscillations accompanying the step, and hence making it possible to shorten the seek time.

Another aspect of the present invention is a head position control method for driving a plurality of heads by a single actuator in order to at least read different disk faces, having the steps of: calculating a servo control amount in accordance with a positional error between a target position of the head and a present position of the head; controlling the actuator by adding an eccentricity correction current corresponding to a selected head of the plurality of heads to the servo control amount; calculating a differential between the eccentricity correction currents of the respective heads before and after switching, and a velocity differential between the heads when switching from one of the heads to another of the heads; and performing feed forward control for reducing the current differential and the velocity differential.

Furthermore, it is preferable that the feed forward control step also includes the steps of: generating a first position trajectory and a first current trajectory for reducing the velocity differential in accordance with the velocity differential; generating a second position trajectory and a second current trajectory for reducing the current differential in accordance with the current differential; correcting the present position by means of the first and second position trajectories; and adding the first and second current trajectories to the eccentricity correction current and supplying same to the actuator.

According to this embodiment of the present invention, the initial velocity when switching heads is preferably predicted and a trajectory for correcting the initial velocity when switching is supplied, thereby making it possible to shorten the seek time. Moreover, when switching heads, the switching differential in the eccentricity correction current is eliminated, and therefore residual oscillations accompanying the differential can be eliminated and the seek time can be shortened.

DESCRIPTION OF THE PREFERRED EMBODIMENTS

Embodiments of the present invention are described herein with respect to a disk storage device, a control system according to a first embodiment, a control system according to a second embodiment, an initial velocity correction trajectory, an initial current correction trajectory, and still further embodiments. One skilled in the art will be aware, however, that the present invention is not limited to these embodiments.

Figure 1:
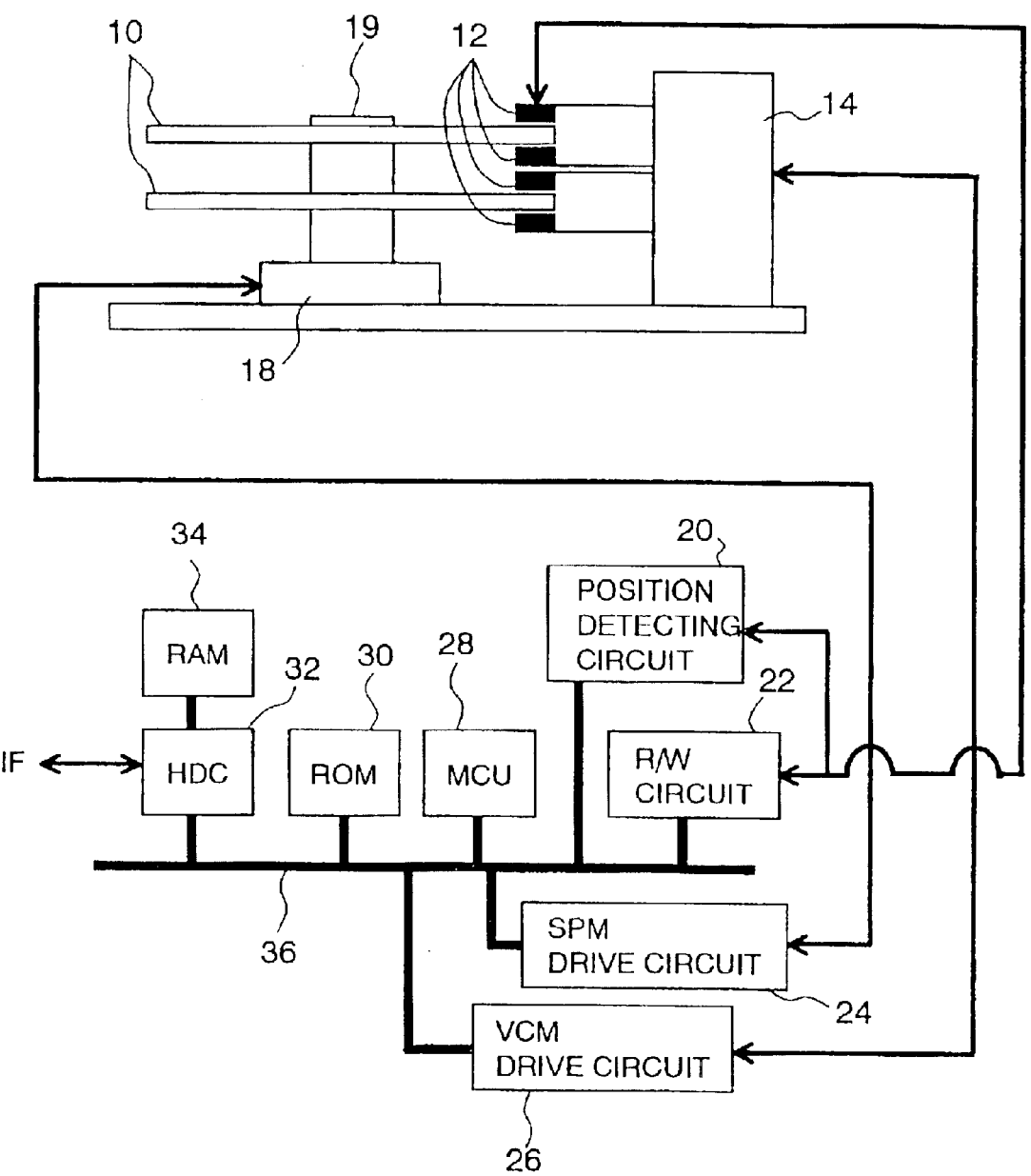
FIG. 1 is a compositional diagram of a disk storage device according to one embodiment of the present invention.

FIG. 1 shows a magnetic disk device as a disk storage device. A magnetic disk 10 forming a magnetic storage medium is provided on a rotating shaft 19 of a spindle motor 18. The spindle motor 18 causes the magnetic disk 10 to rotate. An actuator (VCM) 14 has magnetic heads 12 provided on the front end thereof, and moves the magnetic heads 12 in a radial direction of the magnetic disk 10.

The actuator 14 is constituted by a voice coil motor (VCM) which rotates about a rotating shaft 19. In this case, two magnetic disks 10 are installed in the magnetic disk device, and four magnetic heads 12 are driven simultaneously by the same actuator 14.

Each magnetic head 12 is constituted by a read element and a write element. The magnetic head 12 is preferably formed by layering the read element including a magnetic resistance element onto a slider, and then layering a write element including a write coil thereupon.

A position detecting circuit 20 converts a positional signal (analog signal) read by the magnetic head 12 into a digital signal. A read/write (R/W) circuit 22 controls reading and writing, from and to the magnetic head 12. A spindle motor (SPM) drive circuit 24 drives the spindle motor 18. A voice coil motor (VCM) drive circuit 26 supplies a drive current to the voice coil motor (VCM) 14, thus driving the VCM 14.

A micro-controller (MCU) 28 detects a present position from the digital positional signal supplied by the position detecting circuit 20, and calculates a VCM drive command value in accordance with an error between a detected present position and a target position. In other words, the MCU 28 performs position demodulation and servo control. A read-only memory (ROM) 30 stores a control program, or the like, for the MCU 28. A hard disk controller (HDC) 32 determines the position within the disk 10 circumference by referring to a sector number of a servo signal, and implements data recording or reproduction. A random access memory (RAM) 34 temporarily stores read data and write data. The HDC 32 communicates with a host via an interface IF, such as an ATA or SCSI interface, or the like. A bus 36 connects the elements.

Figure 2:
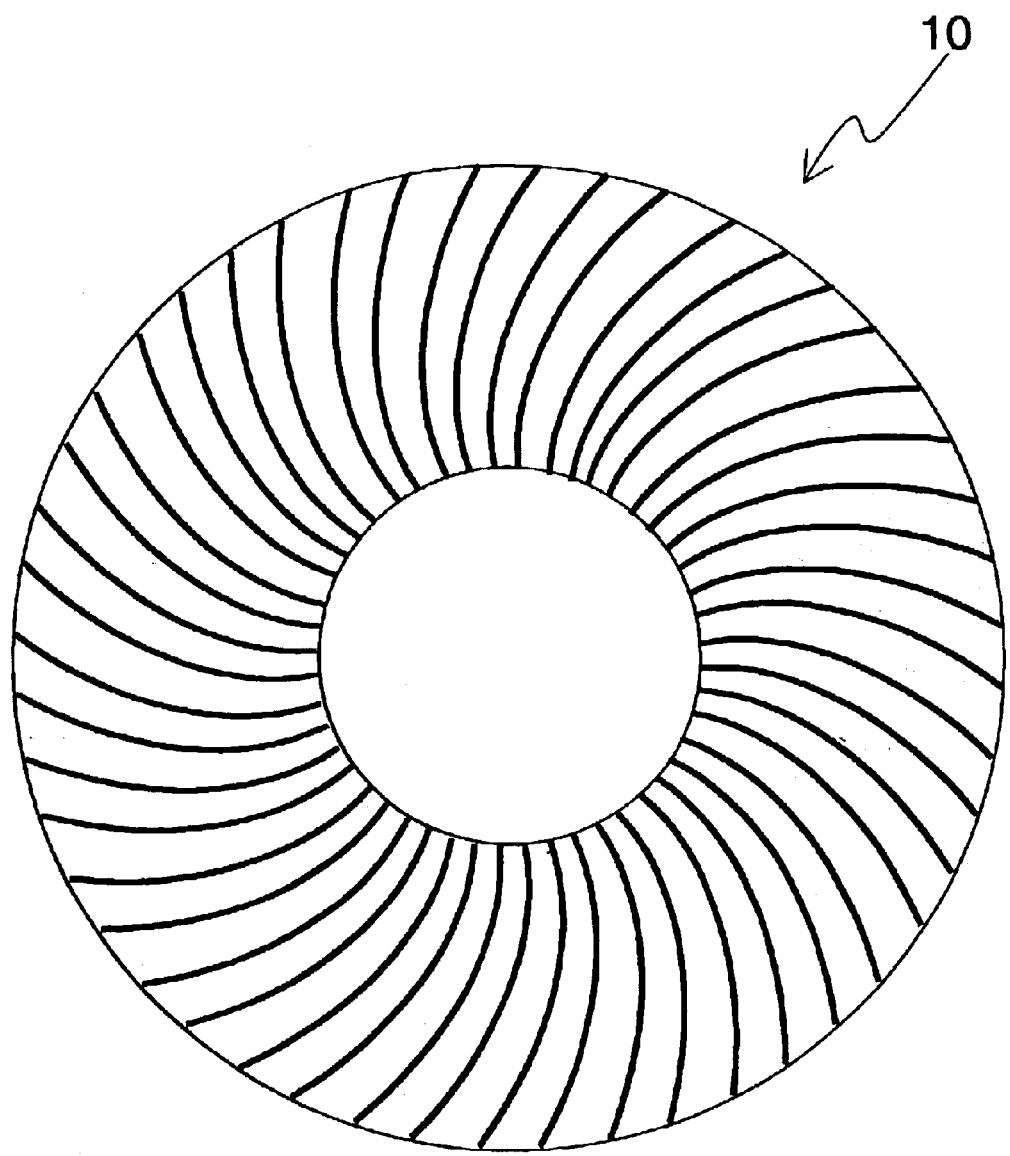
FIG. 2 is an illustrative diagram of a disk position signal in FIG. 1.
Figure 3:
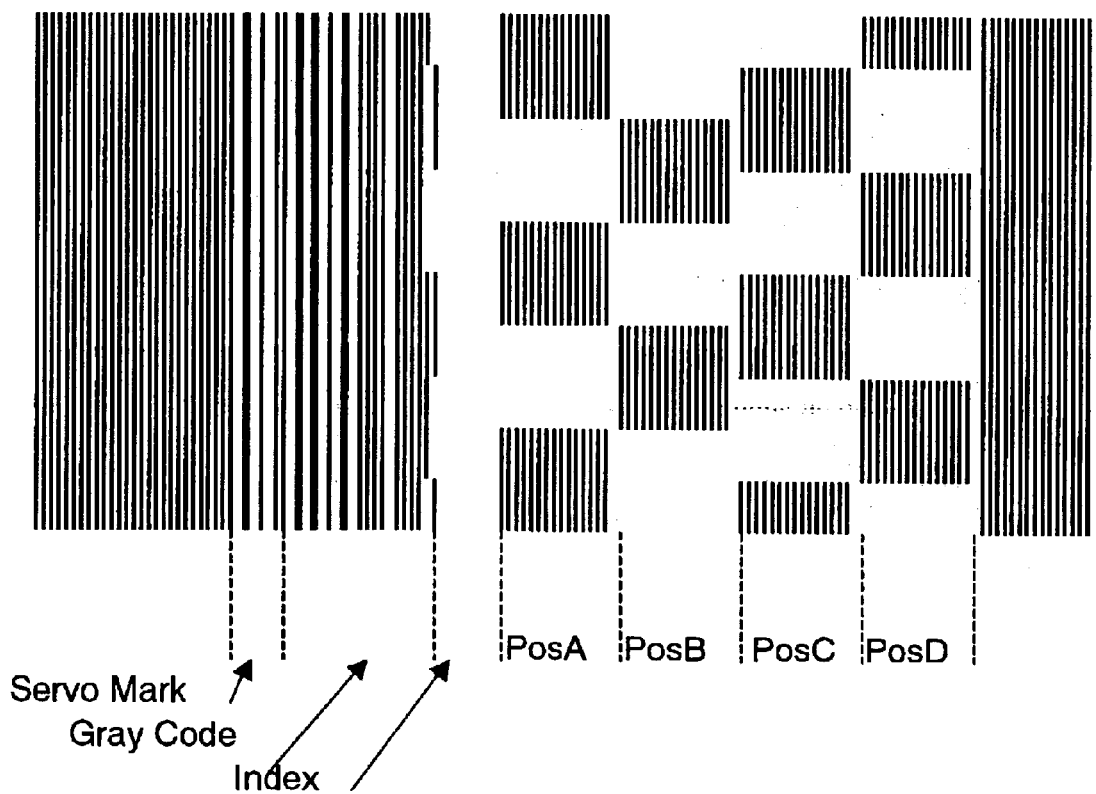
FIG. 3 is a detailed illustrative diagram of the position signal in FIG. 2.

As shown in FIG. 2, in each track of the magnetic disk 10, from the outer perimeter to the inner perimeter, a servo signal (positional signal) is placed in each track, in equidistant fashion in the circumferential direction. Moreover, each track is constituted by a plurality of sectors, and the solid lines in FIG. 2 indicate the recording positions of the servo signal. As shown in FIG. 3, the positional signal is constituted by a Servo Mark, track number (Gray Code), Index, and offset information (PosA, PosB, PosC, PosD).

Using the track number (Gray Code) and the offset information (PosA, PosB, PosC, PosD), it is possible to detect the position of the magnetic head in the radial direction. Moreover, it is also possible to ascertain the position of the magnetic head in the circumferential direction on the basis of the index signal Index. For example, a sector number is set to 0 when the index signal is detected, and each time a servo signal is detected, the sector number is incremented, thereby providing a sector number for each sector in a track.

The sector number in the servo signal is used as a reference when performing data recording or data reproduction. The index signal is generated once per disk revolution, or alternatively, instead of an index signal, it is also possible to provide a sector number.

Figure 4:
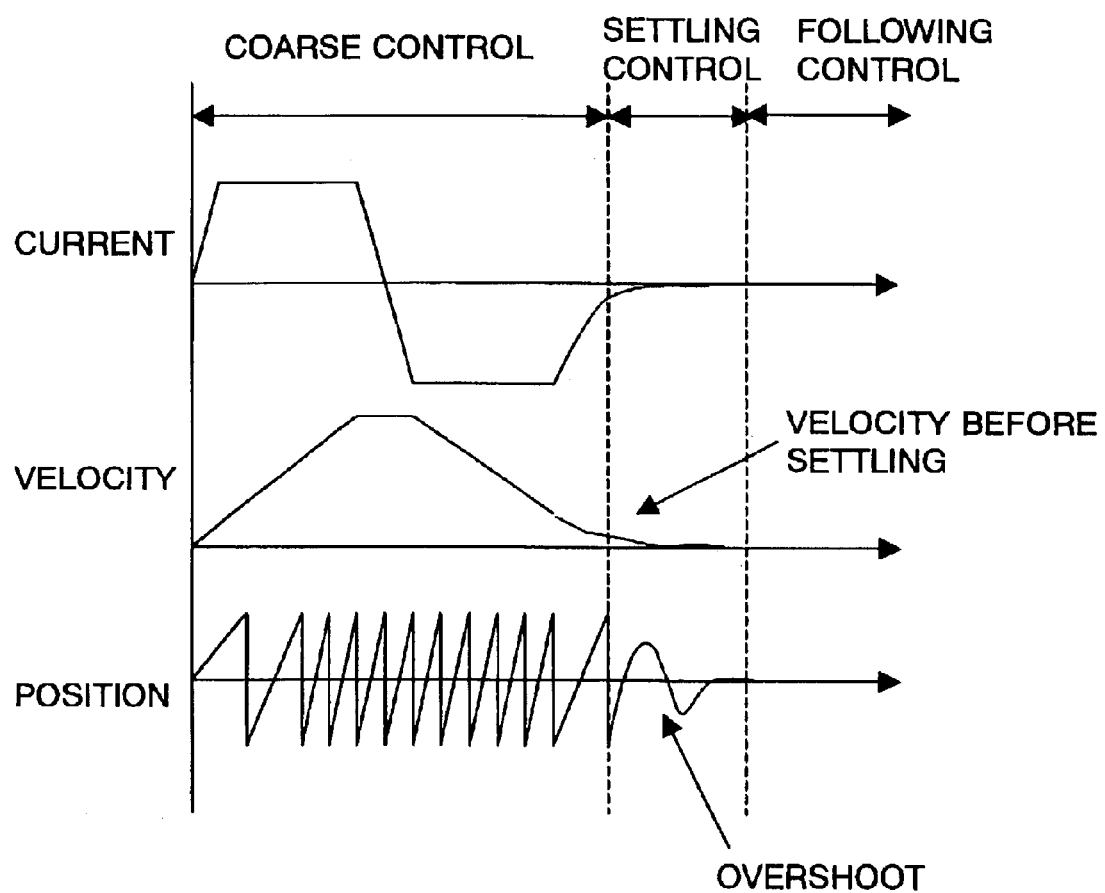
FIG. 4 is an illustrative diagram of a seek operation of the head in FIG. 1.

FIG. 4 is a seek control example for an actuator as implemented by the MCU 28 in FIG. 1. The MCU 28 confirms the position of the actuator via the position detecting circuit 20 in FIG. 1, performs a servo calculation, and supplies an appropriate current to the VCM 14. FIG. 4 illustrates the transition in the control performed after the start of seeking to move the head 12 from a certain track position to a target track position, together with the current of the actuator 14, the actuator (head) velocity, and the actuator (head) position.

In other words, the seek control operation is able to move the head to a target position by transferring between coarse control, settling control, and following control. Coarse control essentially involves velocity control, and settling control and following control essentially involve positional control. In either case, it is necessary to detect the present position of the head.

In order to confirm a position in this manner, as shown in FIG. 2 (described previously), a servo signal is previously recorded onto the magnetic disk 10. In other words, as illustrated in FIG. 3, a signal comprising a servo mark indicating the start position of a servo signal, a gray code indicating a track number, an index signal, and PosA–D indicating an offset, are recorded onto the disk 10. This signal is read out by the magnetic head 12, and the servo signal is converted to a digital value by the position detecting circuit 20. The MCU 28 modulates the head position and controls the actuator 14 by means of the control system described with reference to FIG. 5 below.

Figure 5:
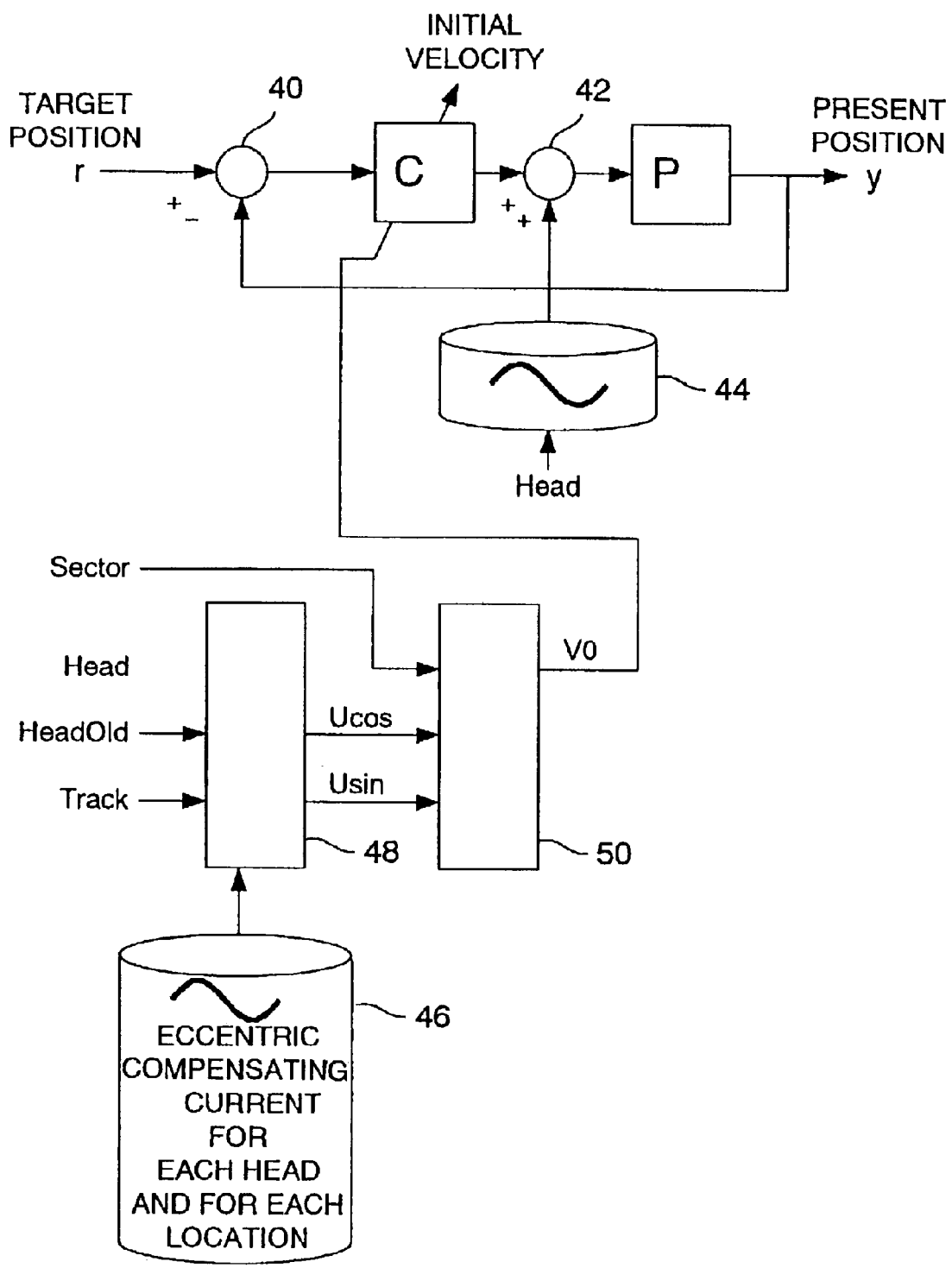
FIG. 5 is a functional block diagram of a first embodiment of a head position controller in FIG. 1.
Figure 6:
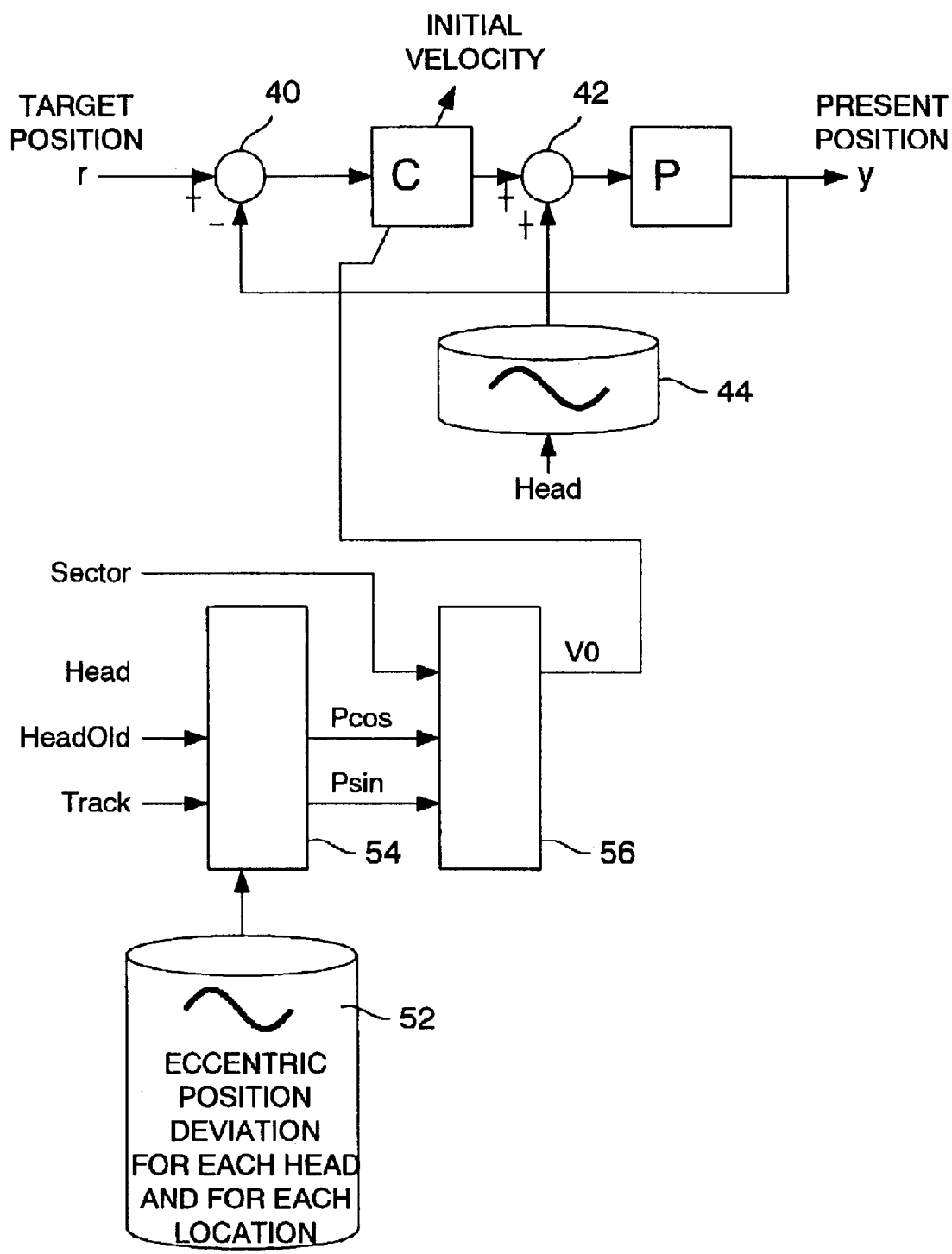
FIG. 6 is a functional block diagram of a modification of a first embodiment of the head position controller in FIG. 1.

The embodiments shown in FIG. 5 and FIG. 6 determine the initial velocity when switching heads and initialize the controller C with the determined initial velocity. According to this embodiment, the deviation in the controller C caused by the initial velocity can be eliminated.

As shown in FIG. 5, a control system for controlling the position of the head from the present position to a target position is constructed of a computing unit 10, which calculates the positional error (r−y) between the target position r and the present position y, and inputs same to the controller C. The controller C is constituted by a commonly known PID controller or observer, and calculates a current for eliminating the positional error, which it then outputs to the actuator P forming the plant. The actuator P is driven and the present position y is output from the head 12 provided on the actuator P.

Moreover, in order to follow the eccentricity of the disk 10, an eccentricity correction current corresponding to the selected head (disk face), Head, is output from a table 44 storing the eccentricity correction current for each head, added to a command current for the controller C by computing unit 42, and supplied to the plant P.

In other words, the controller C determines the differential between the positional information and the target position, performs a calculation according to the magnitude of this positional deviation, and supplies a drive quantity for driving the actuator P, for example, which is a current in the case of a VCM (voice coil motor), or a voltage in the case of a piezo-electric actuator, or the like.

When switching heads, an initial velocity from an initial velocity predicting section is set in the controller C. This initial velocity predicting section determines an initial velocity V0 from the eccentricity correction current. The initial velocity predicting section has an eccentricity correction current table 46, a current differential calculating section 48 for calculating the differential between the eccentricity correction currents of the two heads before and after switching, and a velocity calculating section 50 for calculating an initial velocity when switching heads from the differential in the eccentricity correction current.

Since the eccentricity can be represented by a sinusoidal wave, the eccentricity correction currents are also respective sinusoidal waves. These sinusoidal waves consist of a cosine component and sine component. The eccentricity correction current table 46 stores a cosine component and sine component of the eccentricity correction current for each position (zone) of the disk, and for each head.

When switching heads, the current differential calculating section 48 determines the cosine component and sine component of the head number HeadOld before switching and the head number Head after switching, in the zone of the current track Track from the eccentricity correction current table 46, and it derives the differentials Ucos, Usin between the cosine components and sine components of the two heads, and hence determines the differential in the eccentricity trajectories, in current units.

If the current is integrated, then the integral value is directly proportional to the velocity, and hence the velocity calculating section 50 integrates the current from the current differential calculating section 48, calculates the initial velocity V0 of the switching sector position Sector and sets the same in a controller C.

When switching heads, the controller C is set to this initial velocity V0, and it performs the seek control illustrated in FIG. 4 in accordance with the set initial velocity V0, and in accordance with the differential between the target position and the present position. In FIG. 5, the eccentricity correction current tables 44 and 46 are shown to be used in conjunction.

Next, the control system in FIG. 6 is explained. Elements which are the same as those in FIG. 5 are similarly labelled in FIG. 6. The composition of FIG. 6 is the same as that in FIG. 5, with the exception that the initial velocity predicting section is composed differently.

The composition shown in FIG. 6 is particularly effective in cases where a servo signal is recorded onto disks externally, and the disks are then assembled into the storage device. First, the positional deviation in the radial direction of two heads is measured in the circumferential direction. The change in the positional deviation in the radial direction is a sinusoidal wave. Therefore, the positional deviation in the radial direction is measured in sequence in sector 0 and sector 1, and this deviation waveform is subjected to a Fourier transform to determine sine and cosine coefficients, which are stored in a eccentric positional deviation table 52. A table 52 of this kind is provided for each head. Moreover, measurements are preferably made for a plurality of locations (zones), and not just once for each head.

When switching heads, a positional differential calculating section 54 determines the cosine component and sine component of the head number HeadOld before switching and the head number Head after switching, in the zone of the current track Track from the eccentric positional deviation table 52. Differentials Pcos, Psin are thus derived between the cosine components and sine components of the two heads, and the differential in the eccentricity trajectories are determined in positional units.

If these positions are differentiated, the differential value will be directly proportional to the velocity, and hence the velocity calculating section 56 differentiates the positional differential from the positional differential calculating section 54, calculates the initial velocity V0 of the switching sector position Sector, and sets V0 in the controller C.

When switching heads, the controller C is set with this initial velocity V0 and thereafter performs seek control as shown in FIG. 4, in accordance with the initial velocity V0 thus set, and in accordance with the differential between the target position and the present position.

In this way, an initial velocity is determined from the positional deviation and eccentricity correction current, and when switching heads, this initial velocity is set and seeking is started after the head has been switched. Therefore, it is possible to shorten the seek time due to the initial velocity of the head when switching heads.

Figure 7:
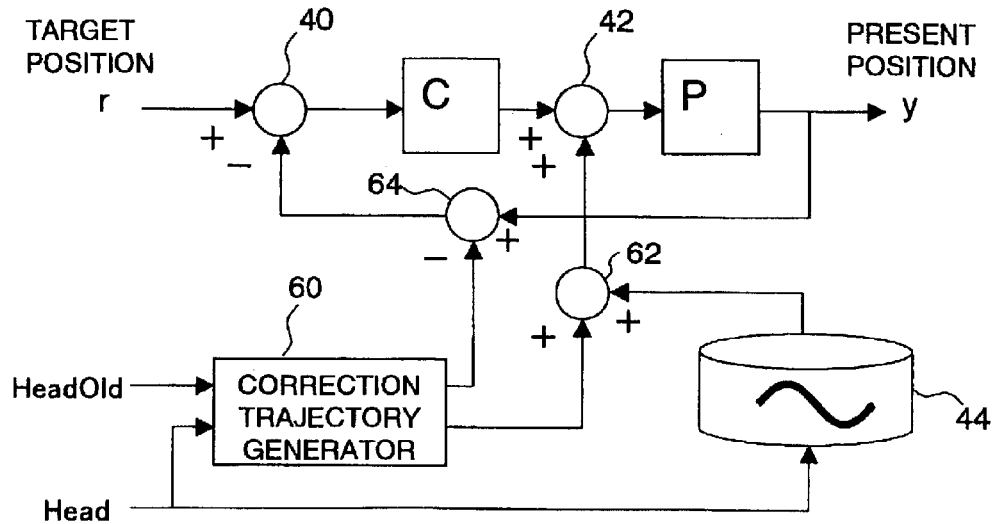
FIG. 7 is a functional block diagram of a second embodiment of the head position controller in FIG. 1.

In the embodiment shown in FIG. 7, the initial velocity and current step when switching heads are determined, a correction position trajectory and a correction current are generated, and the present position and the eccentricity correction current are corrected. According to this embodiment, the state signals are corrected without changing the controller C, and hence deviation upon switching can be eliminated.

In FIG. 7, elements which are the same as those illustrated in FIG. 5 and FIG. 6 are similarly labelled. A correction trajectory generating section 60 generates a position correction trajectory and a current correction trajectory from the head before switching HeadOld, and the head after switching Head. An adder unit 62 adds the current correction trajectory to the eccentricity correction current determined for the head after switching Head from the eccentricity correction table 44, thereby eliminating a step when switching heads. A computing unit 64 subtracts the position correction trajectory from the present position y and outputs the same to the computing unit 40.

In other words, the correction trajectory generating section 60 supplies a trajectory for reducing the initial velocity to zero, externally, to the controller C. The controller C is a conventional type of controller with an initial velocity setting of "0". By adopting this composition, it is possible to adapt to the initial velocity, while maintaining the same structure as a conventional controller C. Moreover, the correction trajectory generating section 60 calculates a trajectory including the current for eliminating the current step corresponding to the initial current u0 and corrects the eccentricity correction current accordingly. Therefore, it is also possible to adapt to the initial current, while maintaining the same structure as a conventional controller C.

Figure 8:
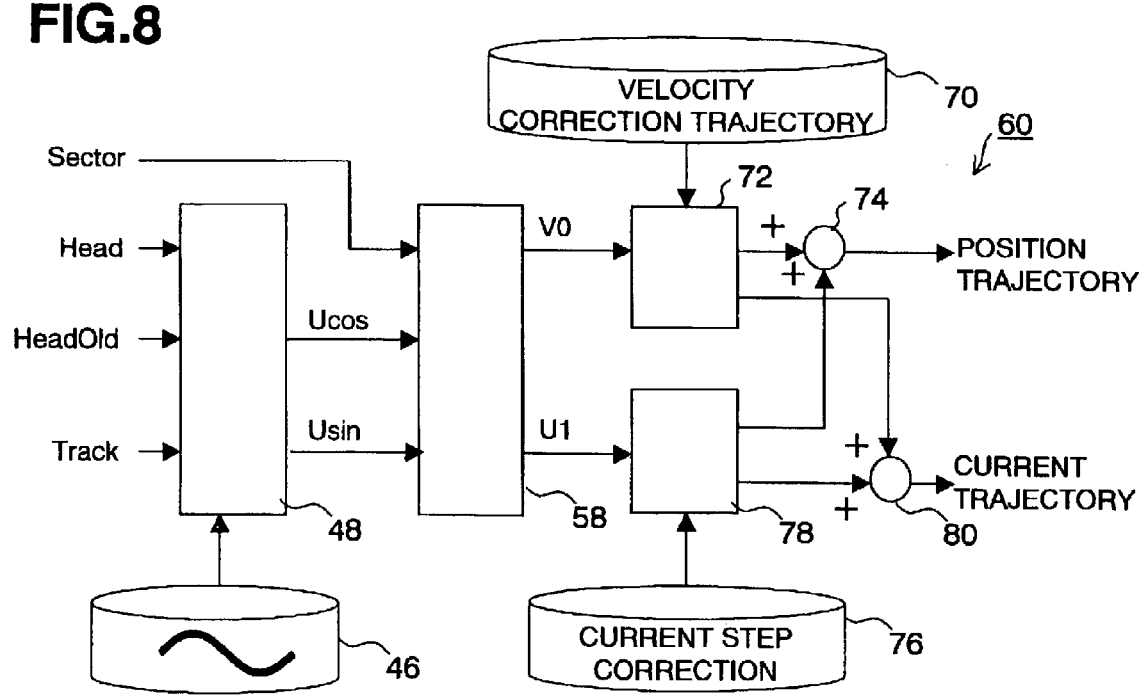
FIG. 8 is a functional block diagram of a first embodiment of a correction trajectory generating section in FIG. 7.

Next, a first embodiment of the correction trajectory generating section 60 shown in FIG. 7 is described, with reference to FIG. 8. This correction trajectory generating section 60 determines the initial velocity V0 and current step U1 from the eccentricity correction current. Thereupon, the section 60 generates a position correction trajectory and current correction trajectory by multiplying by a normalized correction trajectory which reduces this initial velocity and current differential to zero.

The section generating the difference between the eccentricity correction currents of the two heads is constituted by the eccentricity correction current table 46 and the current differential calculating section 48 which calculates the differential between the eccentricity correction currents of the two heads, before and after switching, similarly to FIG. 5 and FIG. 6.

As stated previously, eccentricity can be represented by a sinusoidal wave, and the eccentricity correction currents can also be taken as respective sinusoidal waves. This sinusoidal wave consists of a cos component and sin component. The eccentricity correction current table 46 stores a cosine component and sine component of the eccentricity correction current for each location (zone) of the disk, for each head.

When switching heads, the current differential calculating section 48 determines the cosine component and sine component of the head number HeadOld before switching and the head number Head after switching, in the zone of the current track Track from the eccentricity correction current table 46, and it derives the differentials Ucos, Usin between the cosine components and sine components of the two heads, and hence determines the differential in the eccentricity trajectories, in current units.

An initial velocity and current step calculating section 58 outputs the cosine component and sine component of the differential in the eccentricity correction currents, and therefore the initial velocity and initial current are determined using these two values and the current sector number. In other words, if the current is integrated, then the integral value is directly proportional to the velocity, and hence the calculating section 58 integrates the current from the eccentricity correction current differential calculating section 48, and calculates the initial velocity V0 of the switching sector position Sector. Moreover, the step U1 in the eccentricity correction current is calculated according to the differential between the cosine component and sine component of the respective head at the time of head switching.

Thereupon, two trajectories, one (current, position) for correcting the initial velocity, and another (current, position) for correcting the initial current, are determined by the method described below, and are stored respectively in a velocity correction trajectory table 70 and current differential correction table 76. The position correction trajectory and the current correction trajectory in the respective tables 70, 76 are multiplied by the initial velocity V0 and initial current U1, and are respectively added by adder units 72, 78. The position trajectory and current trajectory corrected respectively to the magnitude of the initial velocity and initial current from the multipliers 72, 78 are added by respective adder units 74, 80, to obtain a trajectory which corresponds to both the initial velocity and the initial current.

Figure 9:
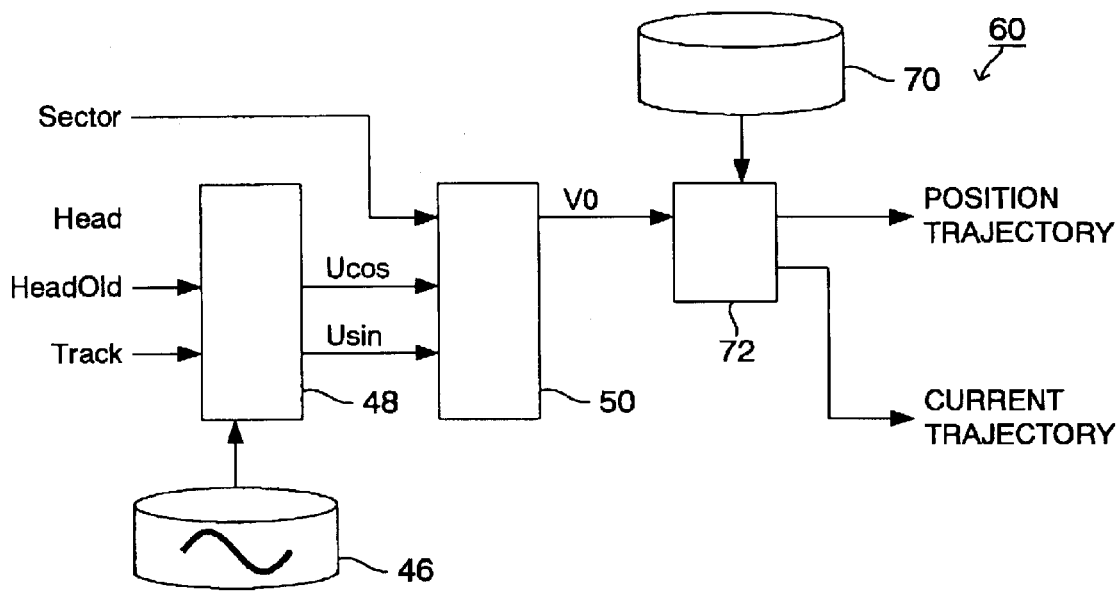
FIG. 9 is a functional block diagram of a second embodiment of the correction trajectory generating section in FIG. 7.

FIG. 9 illustrates a second embodiment of a correction trajectory generating section 60 in FIG. 7. This correction trajectory generating section 60 determines the initial velocity V0 from the eccentricity correction current and multiplies this initial velocity by a correction trajectory which reduces the velocity to zero, thereby generating a position correction trajectory and a current correction trajectory corresponding to the magnitude of the initial velocity.

The section generating the difference between the eccentricity correction currents of the two heads is constituted by the eccentricity correction current table 46 and the current differential calculating section 48 which calculates the differential between the eccentricity correction currents of the two heads, before and after switching, similarly to FIG. 5 and FIG. 6.

As stated previously, eccentricity can be represented by a sinusoidal wave, and the eccentricity correction currents can also be taken as respective sinusoidal waves. This sinusoidal wave consists of a cosine component and sine component. The eccentricity correction current table 46 stores a cosine component and sine component of the eccentricity correction current for each location (zone) of the disk, for each head.

When switching heads, the current differential calculating section 48 determines the cosine component and sine component of the head number HeadOld, before switching and the head number Head after switching, in the zone of the current track Track from the eccentricity correction current table 46, and it derives the differentials Ucos, Usin between the cosine components and sine components of the two heads, and hence determines the differential in the eccentricity trajectories, in current units.

Since the cosine component and sine component of the differential of the eccentricity correction currents is output by the initial velocity calculating section 50, the initial velocity is determined using these two values and the current sector number. In other words, when the current is integrated, it is directly proportional to the velocity, and hence the calculating section 50 integrates the current from the eccentricity correction current differential calculating section 48 to calculate the initial velocity V0 for the switching sector position Sector.

Thereupon, a trajectory for correcting the initial velocity is determined, by the method described below, and stored in a velocity correction trajectory table 70. A multiplier 72 then multiplies the initial velocity V0 respectively by the corrected position trajectory and corrected current trajectory in table 70. A trajectory corresponding to the initial velocity is obtained from the position trajectory and current trajectory corrected to the magnitude of the initial velocity output by the multiplier 72.

In other words, in the present embodiment, a trajectory for reducing the initial velocity to zero is supplied externally to the controller, and the table 76, adders 74, 80, and multiplier 78 in FIG. 8 are eliminated. Therefore, it is possible to use a conventional type of controller C with an initial velocity set to 0, and hence it is also possible to adapt to the initial velocity, while maintaining a conventional controller structure.

Figure 10:
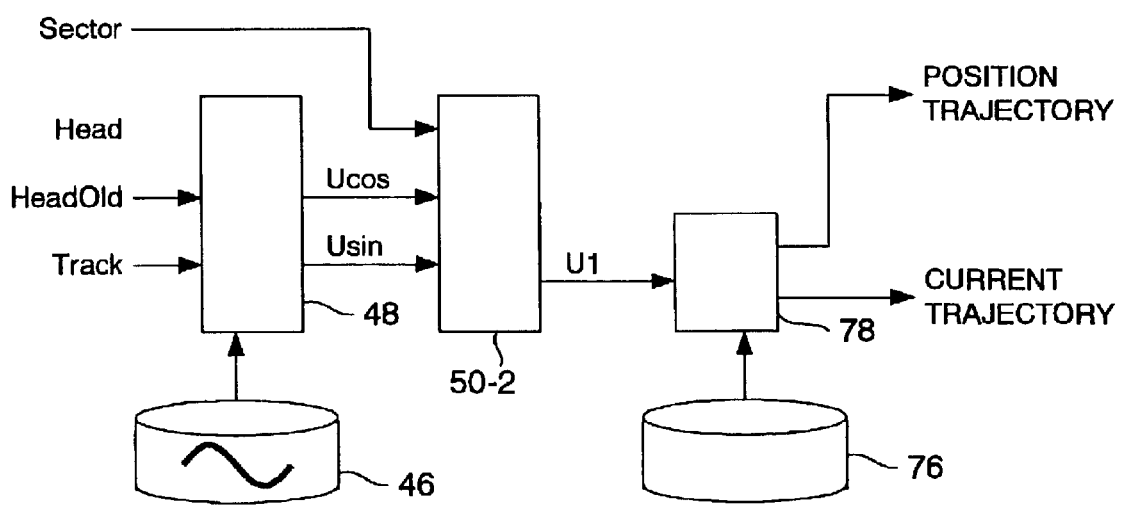
FIG. 10 is a functional block diagram of a third embodiment of the correction trajectory generating section in FIG. 7.

Next, a third embodiment of the correction trajectory generating section 60 shown in FIG. 7 is described with reference to FIG. 10. This correction trajectory generating section 60 determines the current differential U1 from the eccentricity correction current. Thereupon, it multiplies the current differential U1 by a correction trajectory which reduces the initial differential to zero, and hence generates a position correction trajectory and a current correction trajectory.

The section generating the difference between the eccentricity correction currents of the two heads is constituted by the eccentricity correction current table 46 and the current differential calculating section 48 which calculates the differential between the eccentricity correction currents of the two heads, before and after switching, similarly to FIG. 5 and FIG. 6.

As stated previously, eccentricity can be represented by a sinusoidal wave, and the eccentricity correction currents can also be taken as respective sinusoidal waves. This sinusoidal wave consists of a cosine component and sine component. The eccentricity correction current table 46 stores a cosine component and sine component of the eccentricity correction current for each location (zone) of the disk, and for each head.

When switching heads, the current differential calculating section 48 determines the cosine component and sine component of the head number HeadOld before switching and the head number Head after switching, in the zone of the current track Track from the eccentricity correction current table 46, and it derives the differentials Ucos, Usin between the cosine components and sine components of the two heads, and hence determines the differential in the eccentricity trajectories, in current units.

Since the cosine component and sine component of the differential of the eccentricity correction currents is output, the initial velocity calculating section 50-2, calculates the initial current by using these two values and the current sector number. In other words, the differential U1 in the eccentricity correction currents is calculated from the differential between the cosine components and sine components of the respective heads involved in head switching, in the switching sector position Sector.

Thereupon, a trajectory for correcting the initial current is determined, by the method described below, and stored in a current correction trajectory table 76. A multiplier 78 then multiplies the initial current U1 by the corrected position trajectory and corrected current trajectory in the table 76. A position trajectory and current trajectory corrected to the magnitude of the initial current are output by the-multiplier 78.

In other words, in the present embodiment, a trajectory for reducing the initial current to zero is supplied externally to the controller, and the table 70, and adders 72, 74, 80 in FIG. 8 are eliminated from the composition. Therefore, it is possible to adapt to the initial current, whilst maintaining a conventional controller structure.

Next, a trajectory for correcting the initial velocity stored in the initial velocity correction table 70 will be described. For this trajectory definition method, the method described in detail in Japanese Laid-open Patent No. 2000-321037 (Head position control method and device for disk device) can be used. This method is described in simple terms below.

Processing, such as is shown for the following figures, can be executed in a computer using, for example, software such as MATLAB (trade name), or the like. Trajectory definition processing is described below step-by-step in accordance with FIG. 11.

(S10) A frequency to be suppressed in the current waveform is determined. For example, the resonance frequency of the actuator 14 is selected.

Figure 14:
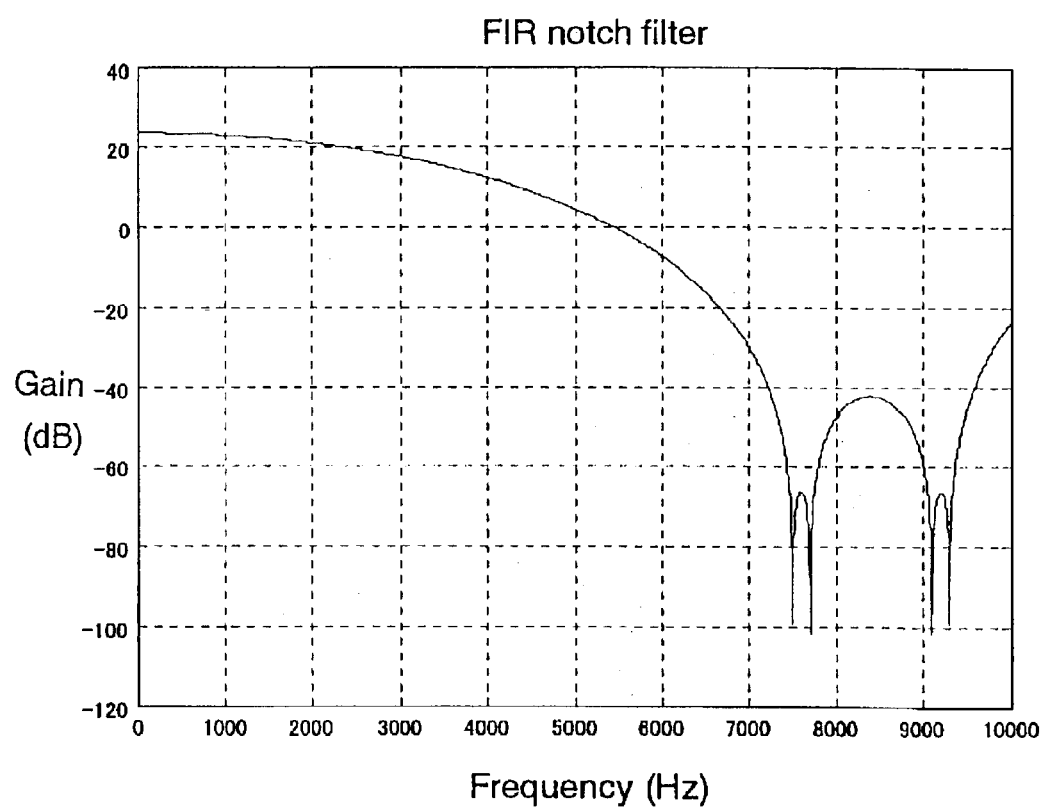
FIG. 14 is an illustrative diagram of a design example of an FIR filter in FIG. 11.

(S12) Thereupon, a FIR (Finite Impulse Response) filter for suppressing this frequency is configured. FIG. 14 is a frequency characteristics graph of the designed FIR filter, and illustrates an FIR filter design example for controlling an actuator having a resonance frequency of 7.6 kHz. Consequently, the FIR filter is preferably configured so as to suppress the frequency components in the region of 7.6 kHz.

Figure 13:
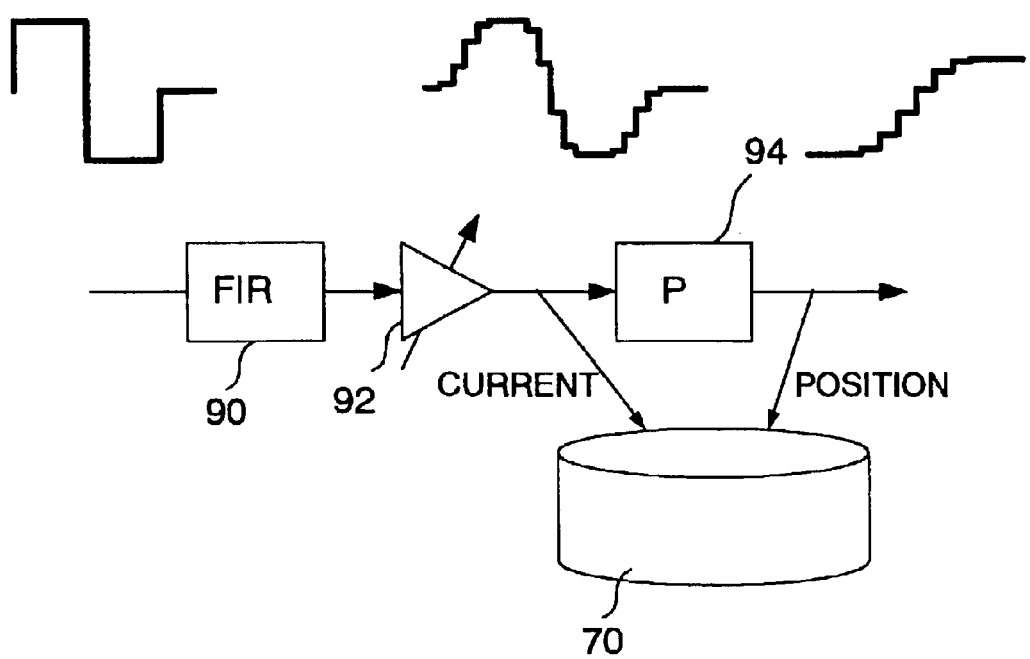
FIG. 13 is a block diagram of the trajectory design in FIG. 11.

(S14) Next, a trajectory design model is created. As shown in FIG. 13, a model of a FIR filter 90, current amplifier 92 and plant (actuator) 94 is created. In this model, the output of the current amplifier 92 is a current, and the output of the plant 94 is a position. When the state of the actuator is represented by (position, velocity), then a trajectory 1 for achieving (1,0)→(0,0) is designed.

Figure 15:
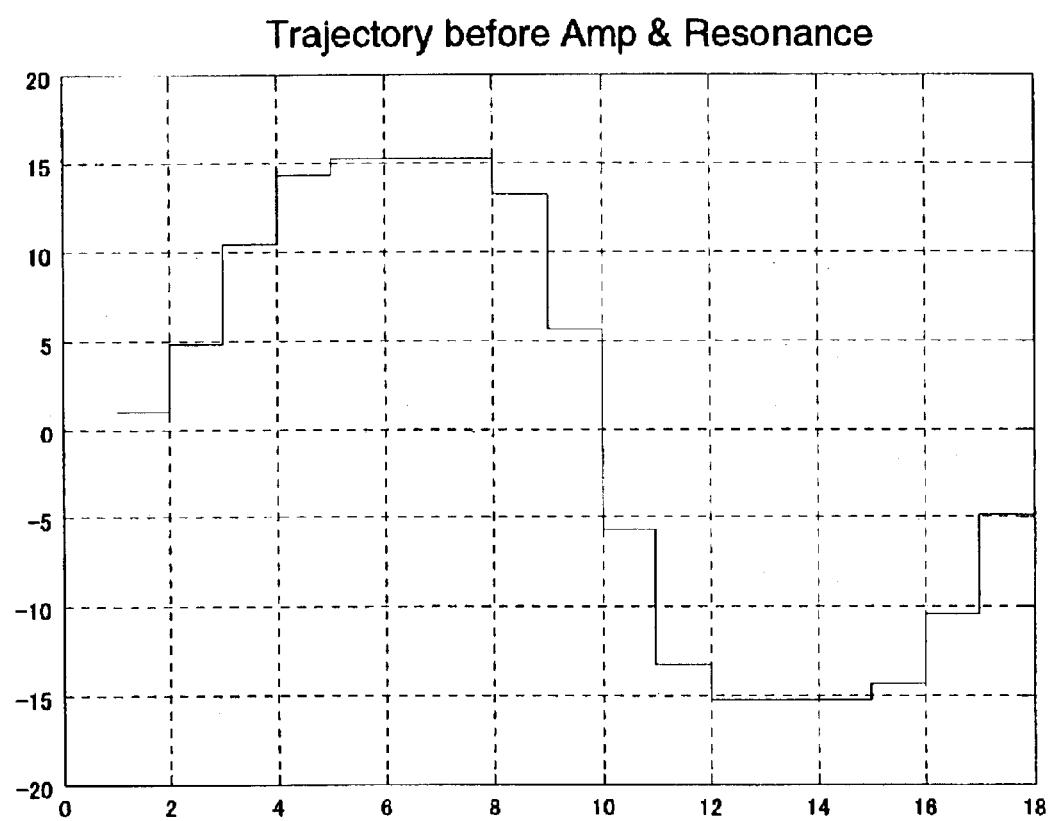
FIG. 15 is an illustrative diagram of an example of the output of a FIR filter in FIG. 14.
Figure 16:
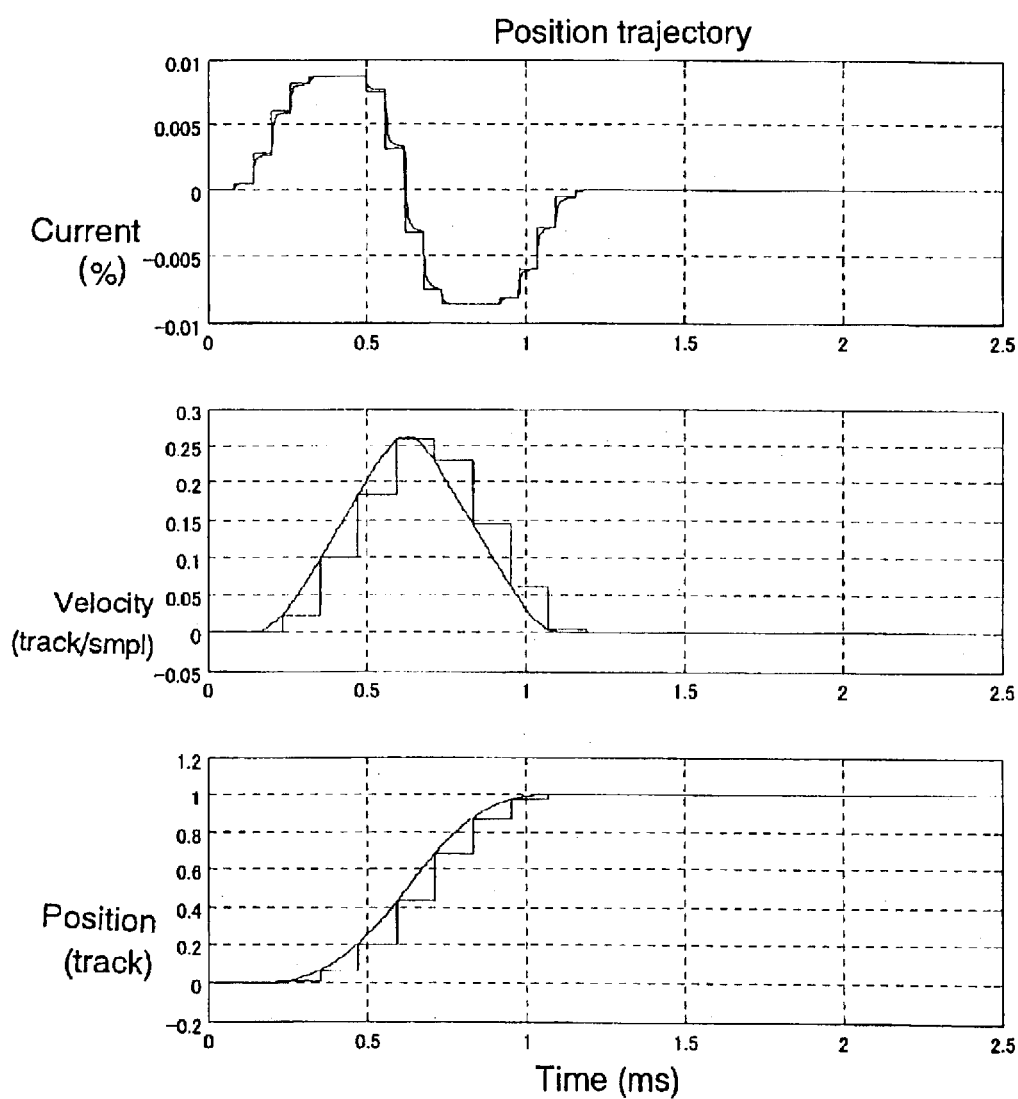
FIG. 16 is an illustrative diagram of the trajectory 1 in FIG. 11.

FIG. 15 is an output waveform in a case where a square waveform is supplied to the FIR filter 90. FIG. 16 illustrates a case where a current of a magnitude sufficient to move by exactly one track has been derived with respect to the waveform in FIG. 15. When the state of the actuator is represented by (position, velocity), then the trajectory (0,0)→(1,0). In other words, the current, velocity and position are indicated. This trajectory is equivalent to the trajectory (−1,0)→(0,0), and hence a trajectory 1 is obtained.

Figure 17:
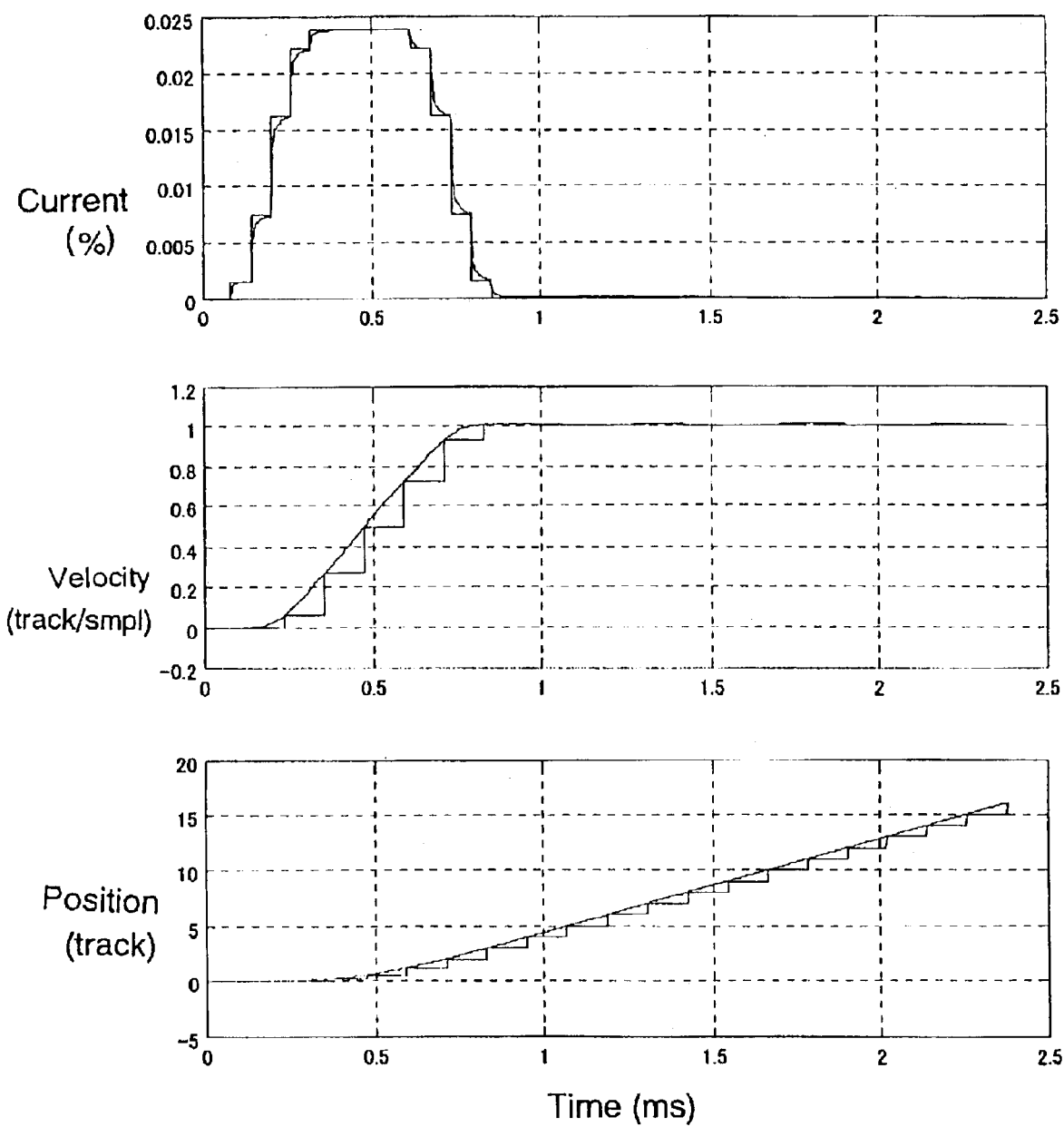
FIG. 17 is an illustrative diagram of the trajectory 2 in FIG. 11.

(S16) Thereupon, a trajectory 2 for (0,0)→(X,1) is designed. FIG. 17 shows a trajectory for (0,0)→(X,1). A square wave current is obtained via the preceding FIR filter 90, in such a manner that the velocity becomes exactly one track/sample.

Figure 18:
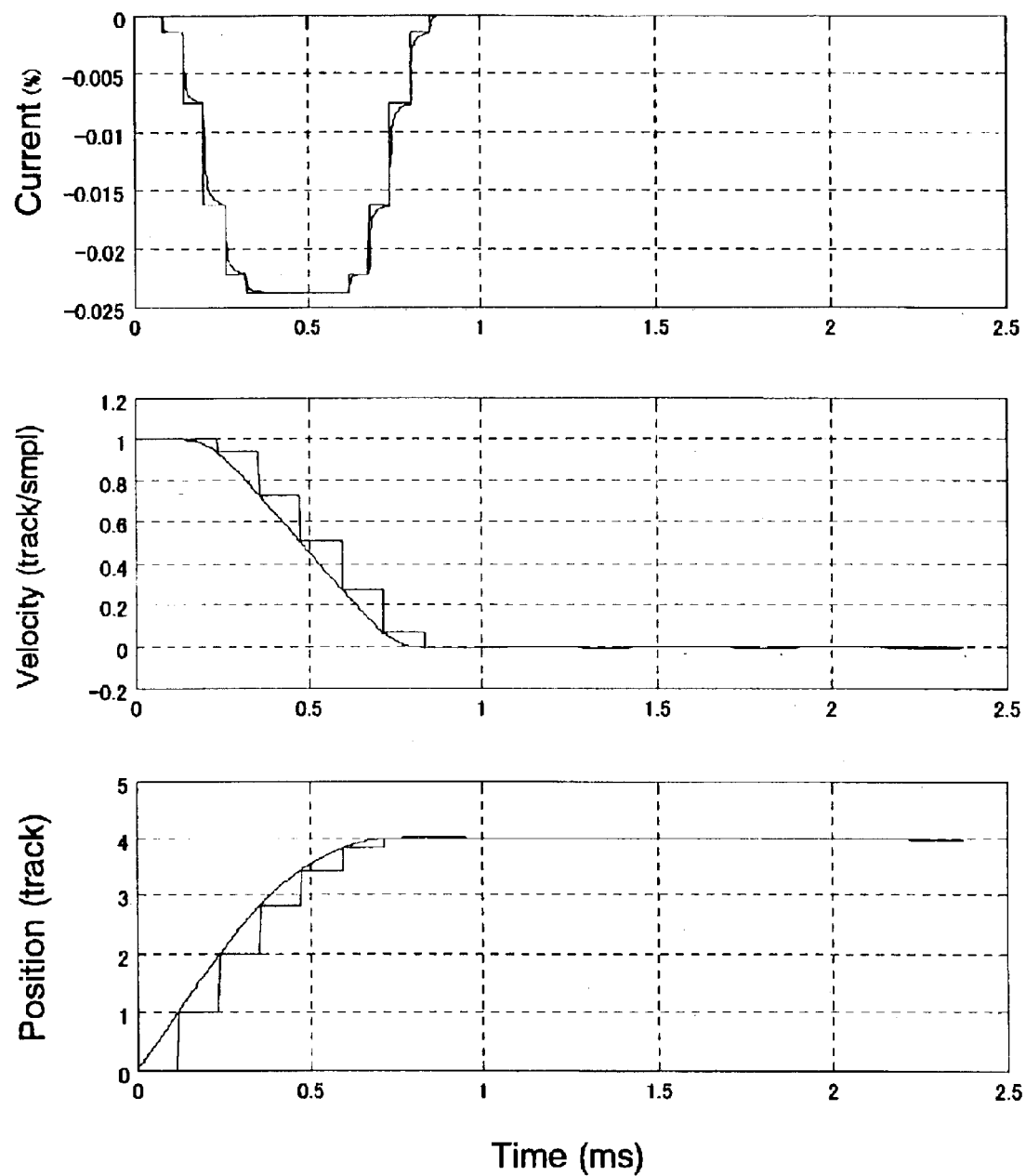
FIG. 18 is an illustrative diagram of the trajectory 3 in FIG. 11.

(S18) Thereupon, a trajectory 3 for (0,1)→(X,0) is designed. By passing the current in FIG. 17 in an opposite direction, the trajectory (0,1)→(X,0) as illustrated in FIG. 18 is obtained. Since it is not possible to determine trajectory 3 directly, trajectory 2 is determined and trajectory 3 is derived by passing the current in the opposite direction. As shown in FIG. 18, at this stage, the position has still not reached "0".

Figure 19:
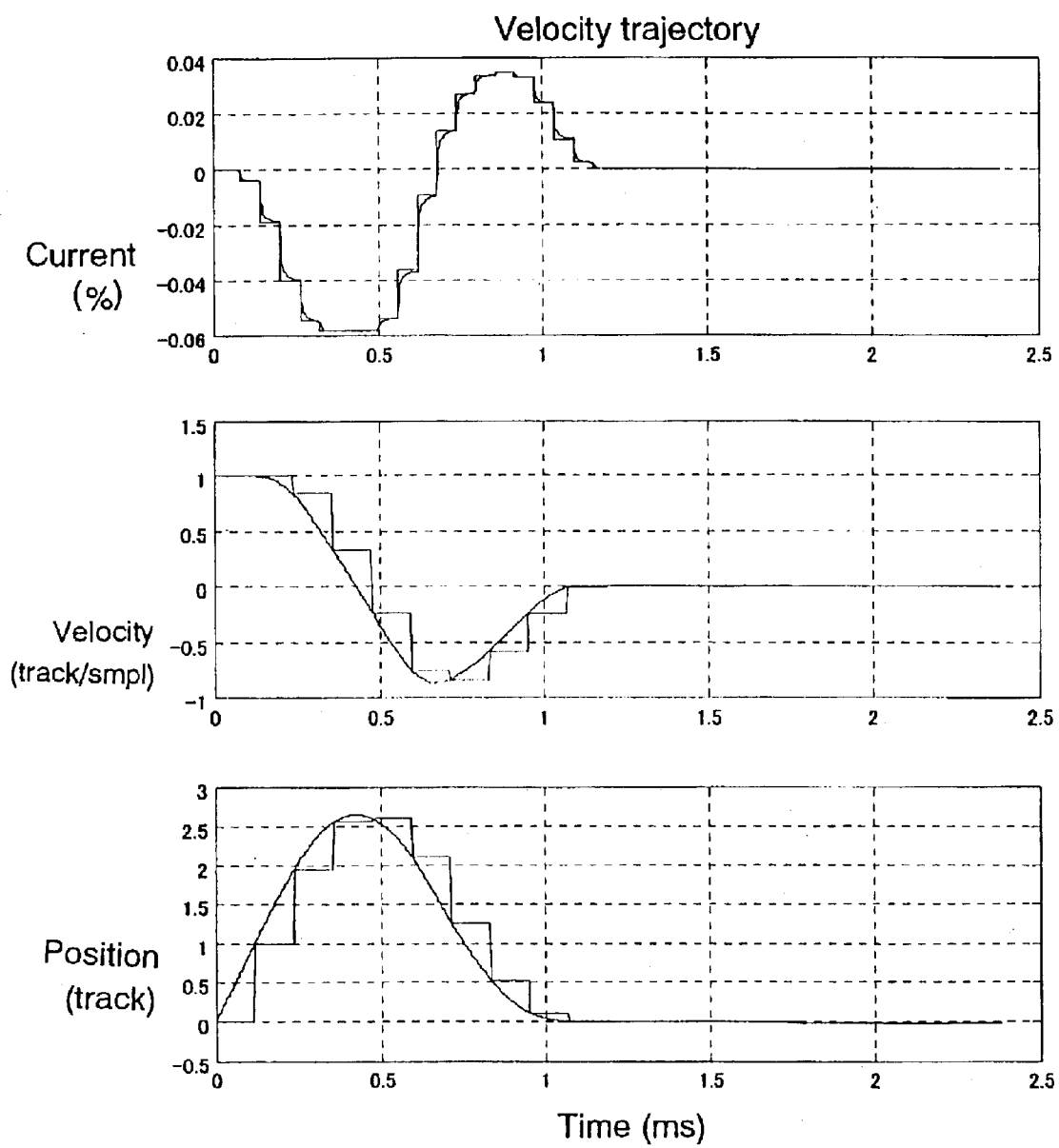
FIG. 19 is an illustrative diagram of the trajectory 4 in FIG. 11.

(S20) Thereupon, a trajectory 4 for (0,1)→(0,0) is designed. In other words, in order to return the position of trajectory 3 in FIG. 18 to "0", the sum of trajectory 3 in FIG. 18, and trajectory 1 in FIG. 16, which cancels out the remaining position of the trajectory 3 in FIG. 18 is performed, thereby yielding the trajectory (0,1)→(0,0) in FIG. 19. The trajectory in FIG. 19 is thus the trajectory for correcting the initial velocity. In other words, it is a normalized current and position trajectory for reducing the velocity "1" to velocity "0" as shown in FIG. 19.

(S22) The normalized current trajectory and position trajectory in trajectory 4 is stored in table 70 as a velocity correction trajectory.

Figure 12:
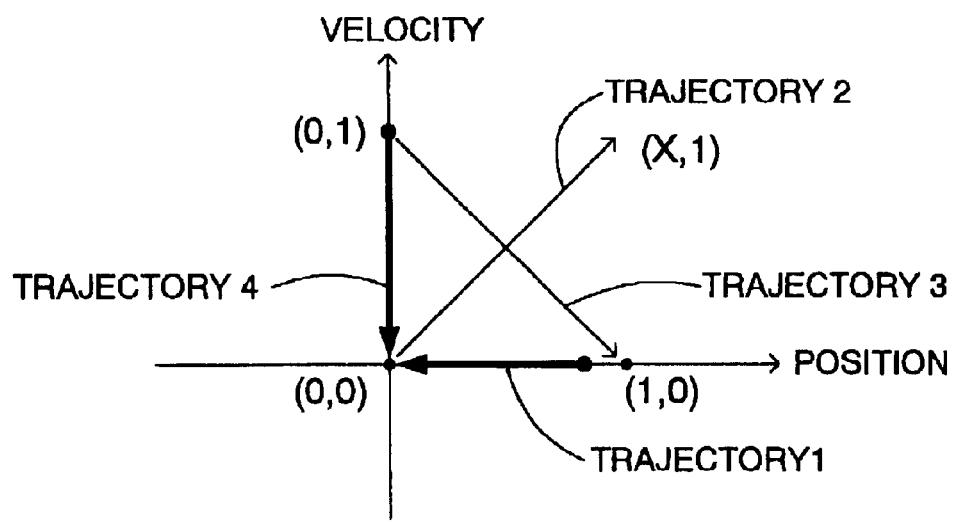
FIG. 12 is an illustrative diagram of the respective design trajectories in FIG. 11.

FIG. 12 illustrates the relationships between the aforementioned trajectories 1–4. The correction trajectory for reducing the initial velocity to "0" is trajectory 4. Since this trajectory is not determined directly, trajectory 1 for moving the position only, and trajectories 2 and 3 for changing the position and velocity, are configured and the trajectory 4 for returning the position of trajectory 3 to "0" is then also configured. According to this embodiment, it is possible to correct the initial velocity to "0".

Figure 20:
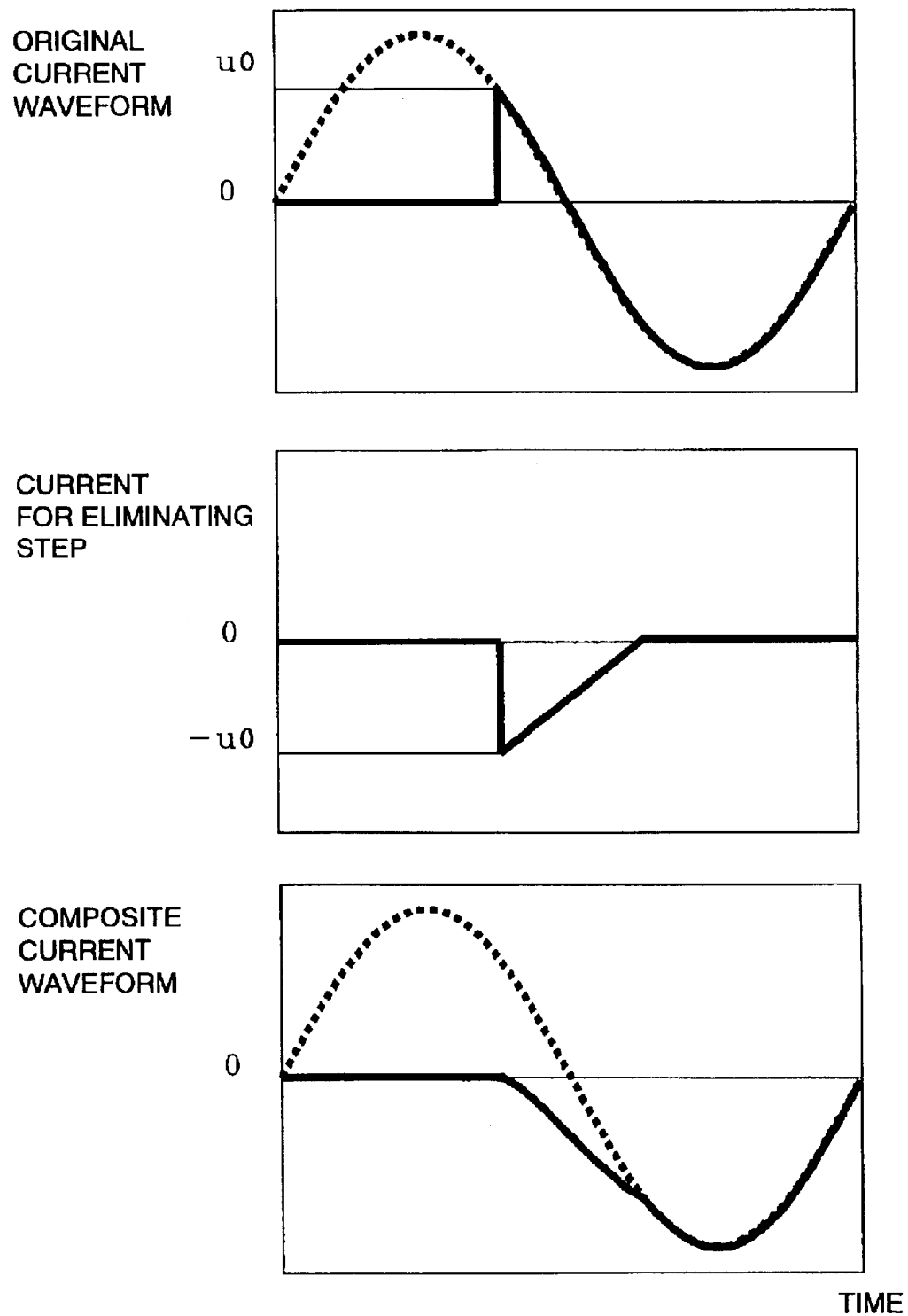
FIG. 20 is an illustrative diagram of correction of the differential in eccentricity correction current according to a second embodiment of the present invention.
Figure 29:
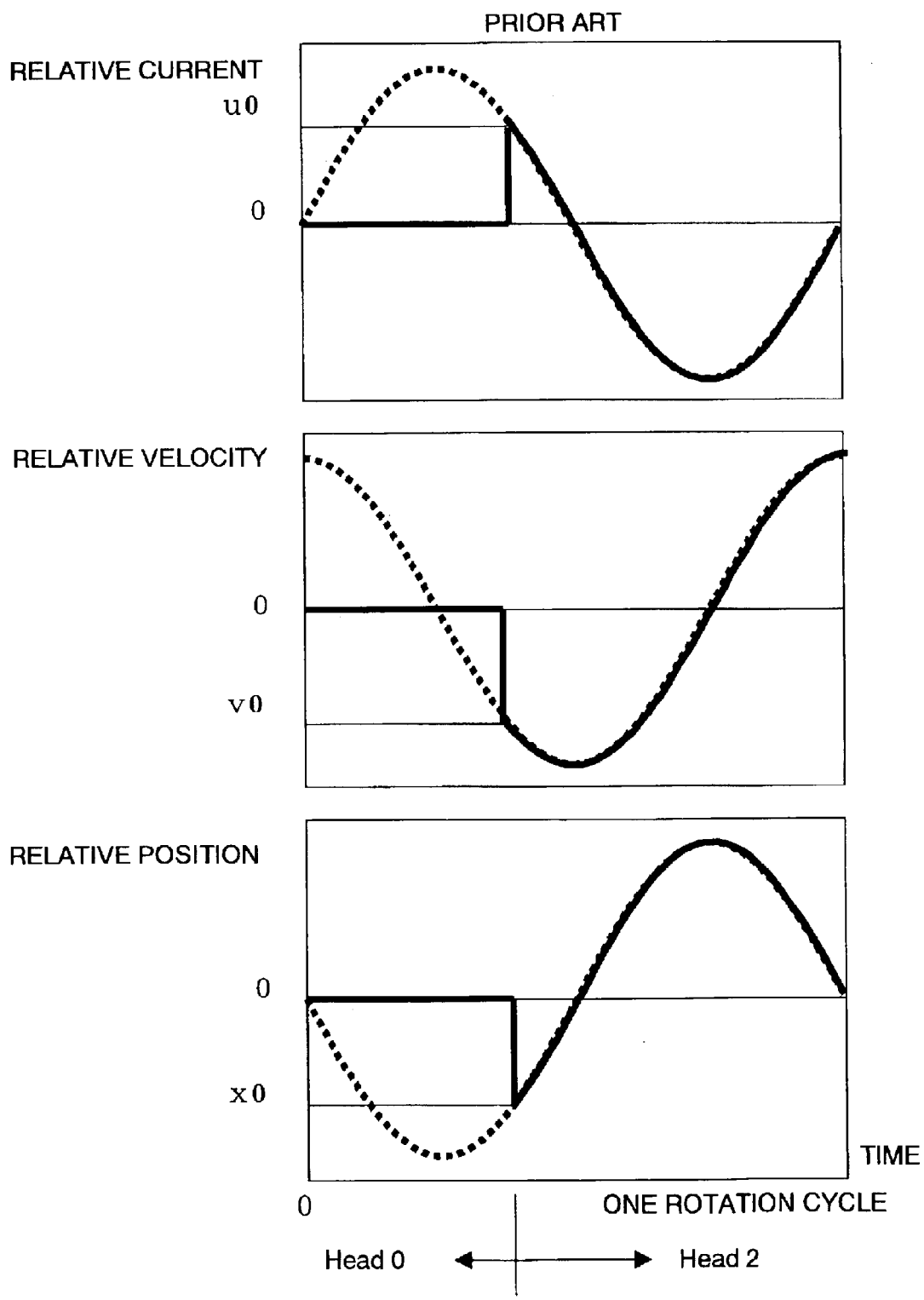
FIG. 29 is an illustrative diagram of switching of eccentric trajectories.

A method of defining a trajectory for correcting the step differential in the eccentricity correction current when switching heads is now described. FIG. 20 is an illustrative diagram of the correction of eccentricity correction current step differentials. The problem presented by the initial current u0 in FIG. 29 is the value of u0 itself. As shown in FIG. 20, by applying a current in the opposite direction to the original current waveform having the initial current u0, in such a manner that the value of u0 becomes "0", it is possible to prevent the occurrence of a current differential when switching heads, as illustrated by the synthesized current waveform in FIG. 20.

In other words, a step differential eliminating current should be applied which has a waveform with an initial value of −u0, reducing to 0 after a prescribed time period has elapsed. In the middle diagram in FIG. 20, a triangular wave is used as an example of this waveform. Consequently, it is possible to eliminate the current step differential, in the manner illustrated by the bottom diagram in FIG. 20.

Figure 21:
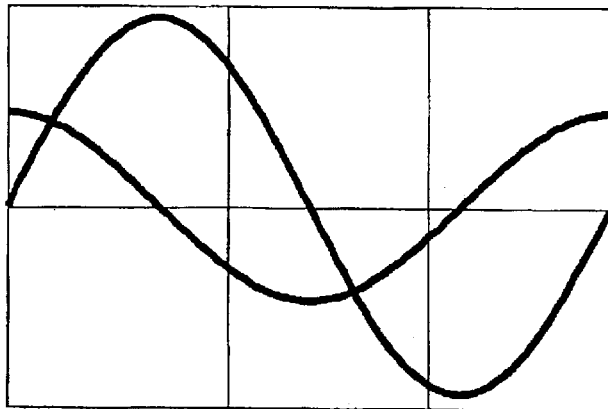
FIG. 21 is an illustrative diagram of differential correction in a case where two disks have eccentricity as in FIG. 20.
Figure 21:
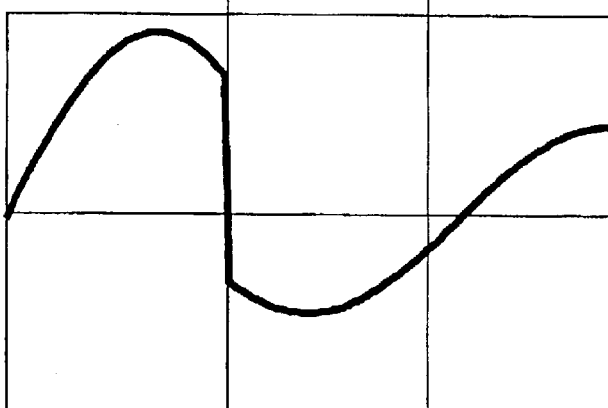
Figure 21:
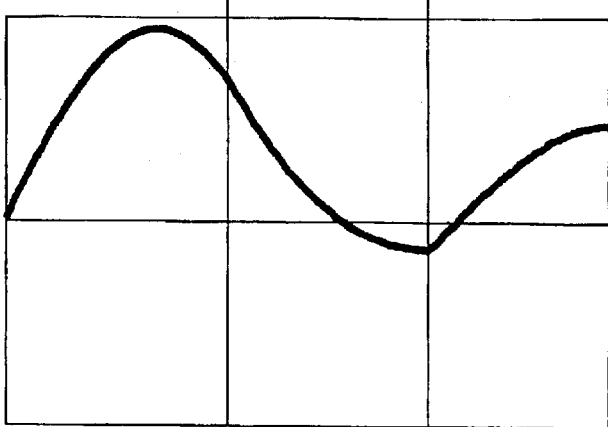

FIG. 21 shows the state of an eccentricity correction current when both disks are taken as being eccentric. In a case where both faces are eccentric, then if the heads are simply switched, a step differential will be generated in the current, as illustrated by the middle diagram. However, it is possible to eliminate this step differential by applying a correction current when switching heads.

Figure 22:
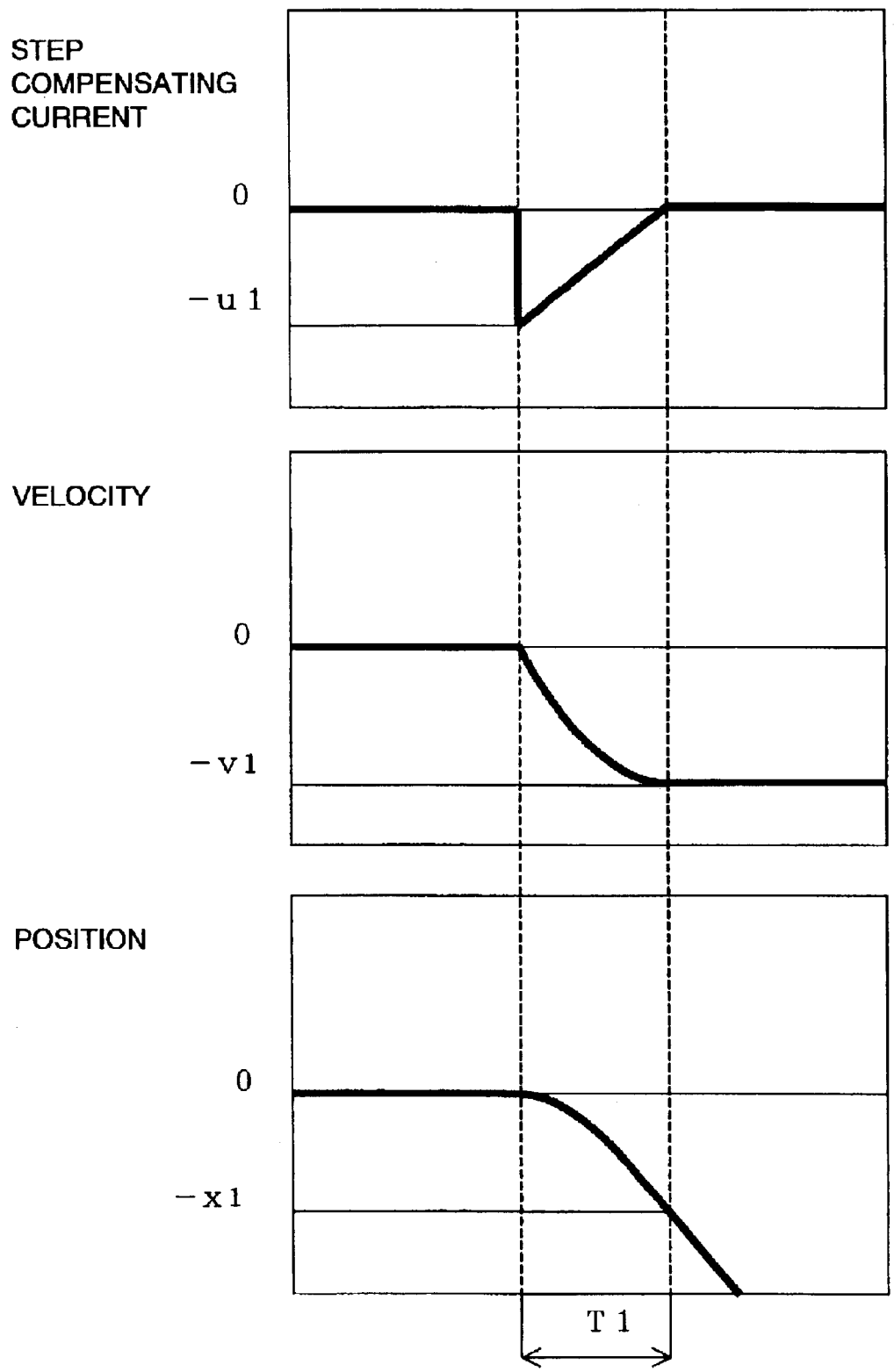
FIG. 22 is an illustrative diagram of the operation of an actuator according to the differential correction shown in FIG. 20.

Using this correction current alone, a problem occurs in that the fact of applying a surplus step differential eliminating current as illustrated by the middle diagram in FIG. 20 causes a corresponding movement in the actuator. FIG. 22 is an illustrative diagram of the actuator operation caused by this step differential eliminating current. FIG. 22 shows the change in position and velocity when the triangular current (differential eliminating current) shown in the middle diagram in FIG. 20 is applied to the actuator. When the triangular current has reached exactly "0", a deviation of V1 in the velocity and X1 in the position occurs.

Figure 11:
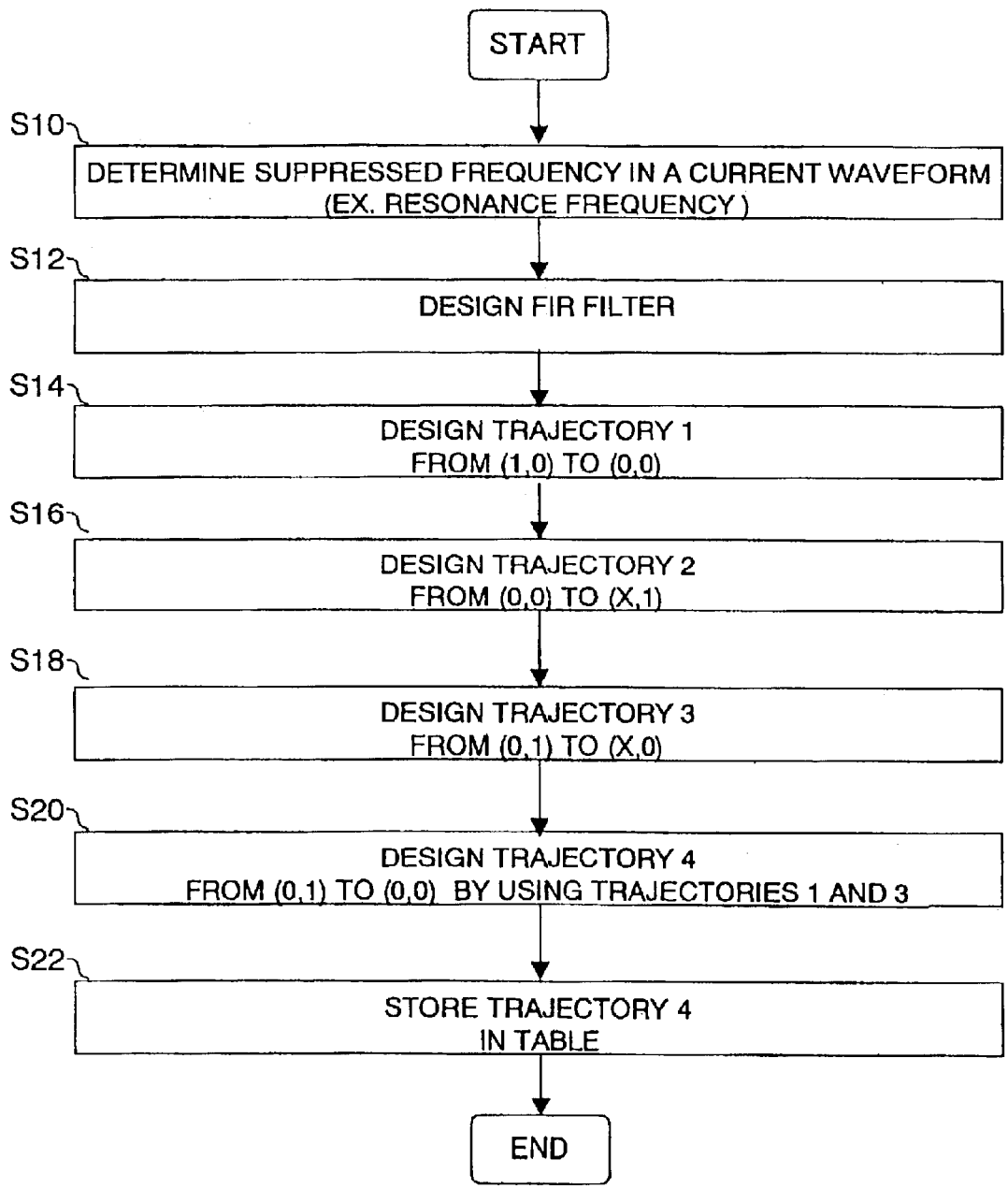
FIG. 11 is a design process flow diagram of an initial velocity correction trajectory according to a first embodiment of the present invention.

In order to eliminate this deviation in the velocity and position, a trajectory design is adopted which corrects the initial velocity as illustrated in FIG. 11 and subsequent diagrams. In other words, a correction trajectory is generated using technology which designs a trajectory reducing any position or velocity to "0". More precisely, a trajectory (X1,V1)→(0,0) is designed and used for correction.

Figure 23:
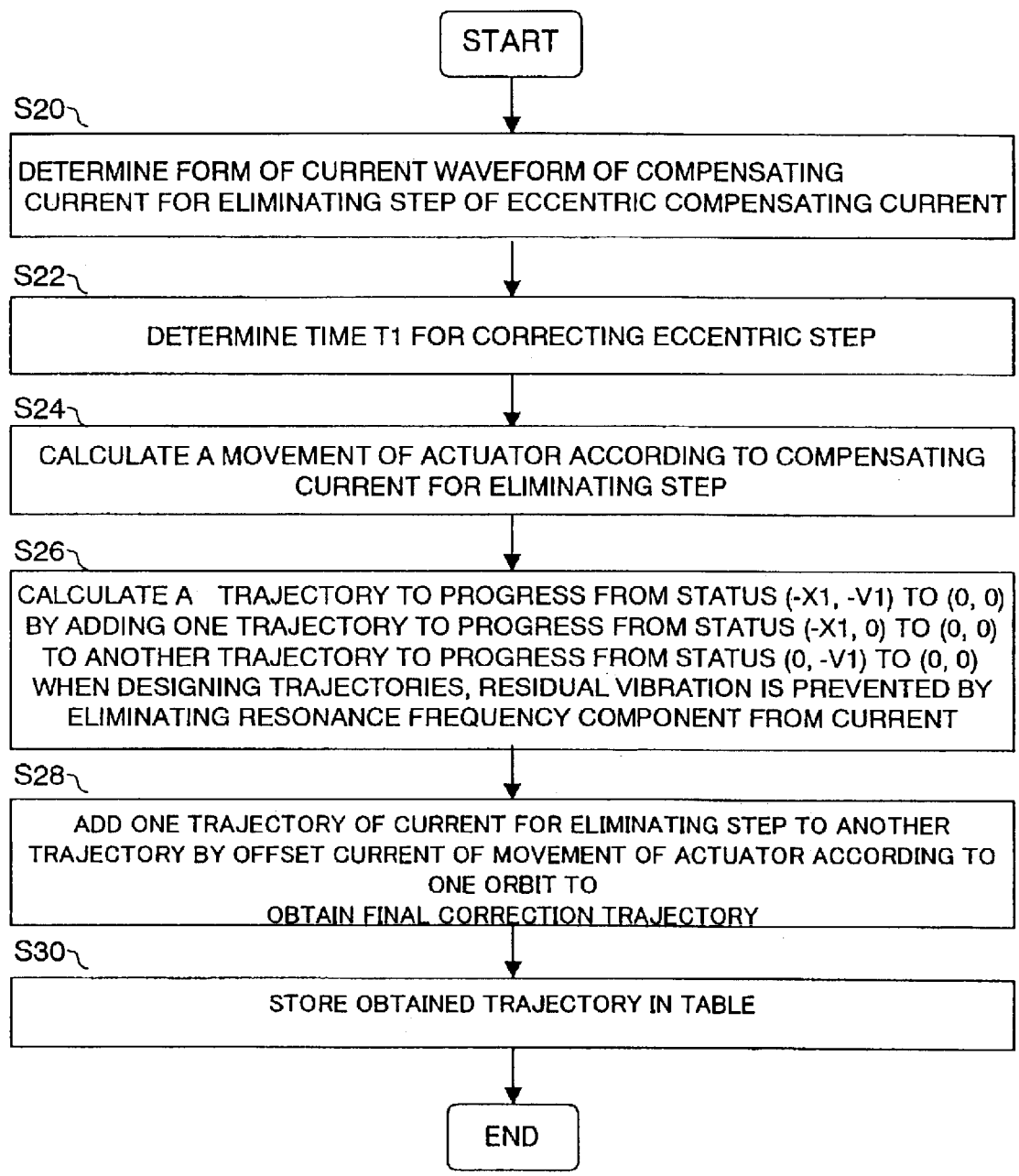
FIG. 23 is a design process flow diagram of a current for eliminating current differential according to a second embodiment of the present invention.

FIG. 23 is a design process flow diagram of a step differential eliminating correction current of an eccentric correction current and is described below step-by-step.

(S20) The waveform of a correction current for eliminating the eccentricity correction current step differential is determined. In FIG. 20, this waveform is shown to be triangular, for example.

(S22) Thereupon, a time period T1 (see FIG. 22) for correcting the eccentricity step differential is determined.

(S24) Next, the movement of the actuator in response to the correction current for eliminating the step differential is calculated by simulation. In other words, values are determined for the position and velocity (−X1,−V1) after the time period T1 has elapsed from the start of the supply of the correction current.

(S26) A trajectory for shifting the state (−X1,−V1) to (0,0) is configured. For this purpose, the initial position and the initial velocity are considered separately, and two trajectories are designed for (−X1,0)→(0,0) and (0,−V1)→(0,0). The design method is similar to that described in FIG. 11 and subsequent diagrams. By synthesizing these two trajectories, the trajectory (−X1,−V1)→(0,0) is determined.

(S28) By deriving the sum of the trajectory (current trajectory for eliminating step differential) (0,0)→(−X1,−V1) by applying a triangular current, and the trajectory determined for (−X1,−V1)→(0,0), it is possible to obtain a trajectory for achieving (0,0) after a specified period of time has elapsed by applying a triangular current.

(S30) The trajectory (current and position trajectory) thus determined is stored in table 76.

According to this embodiment, it is possible to eliminate the current step differential without altering the position or velocity of the actuator.

Figure 24:
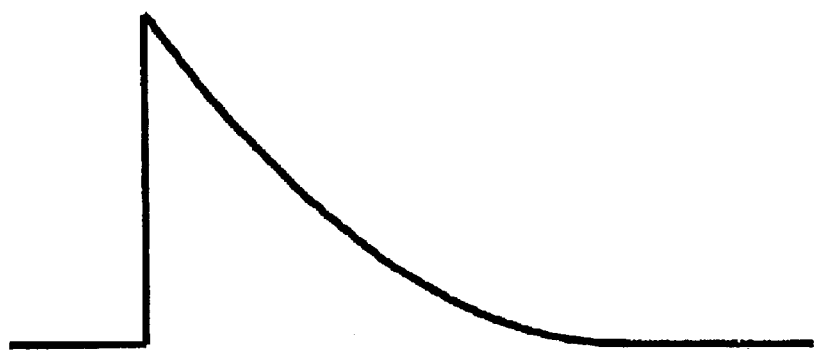
FIG. 24 is a further waveform of the differential correction current shown in FIG. 20.
Figure 25:
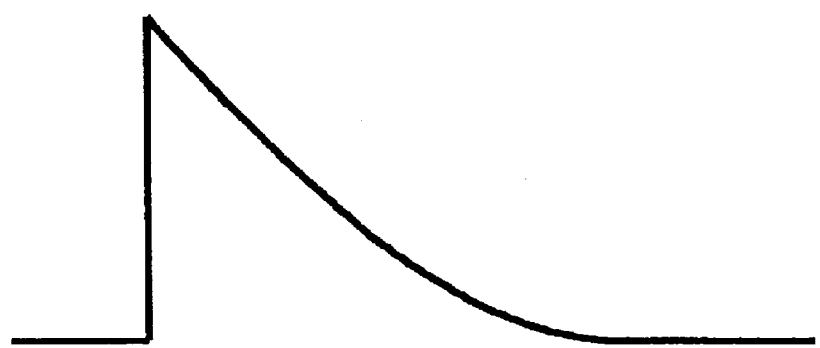
FIG. 25 is yet another waveform of the differential correction current in FIG. 20.
Figure 26:
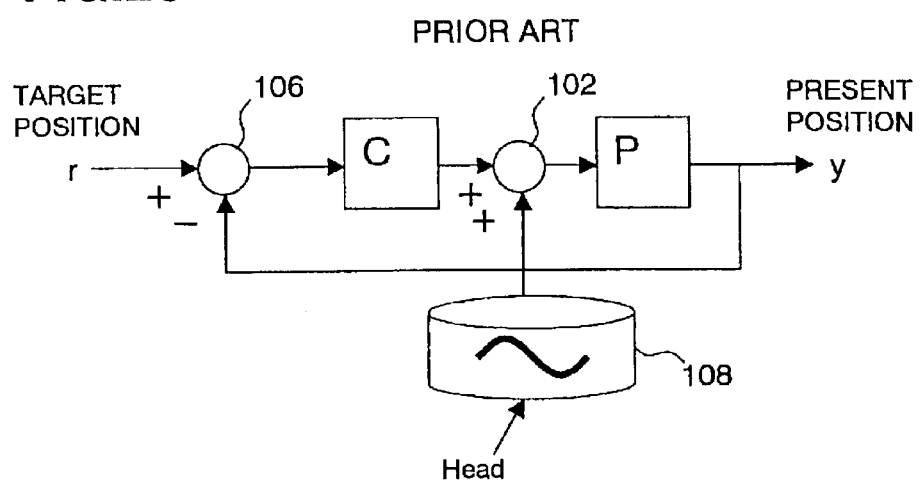
FIG. 26 is an illustrative diagram of a control system of a conventional magnetic disk device.
Figure 27:
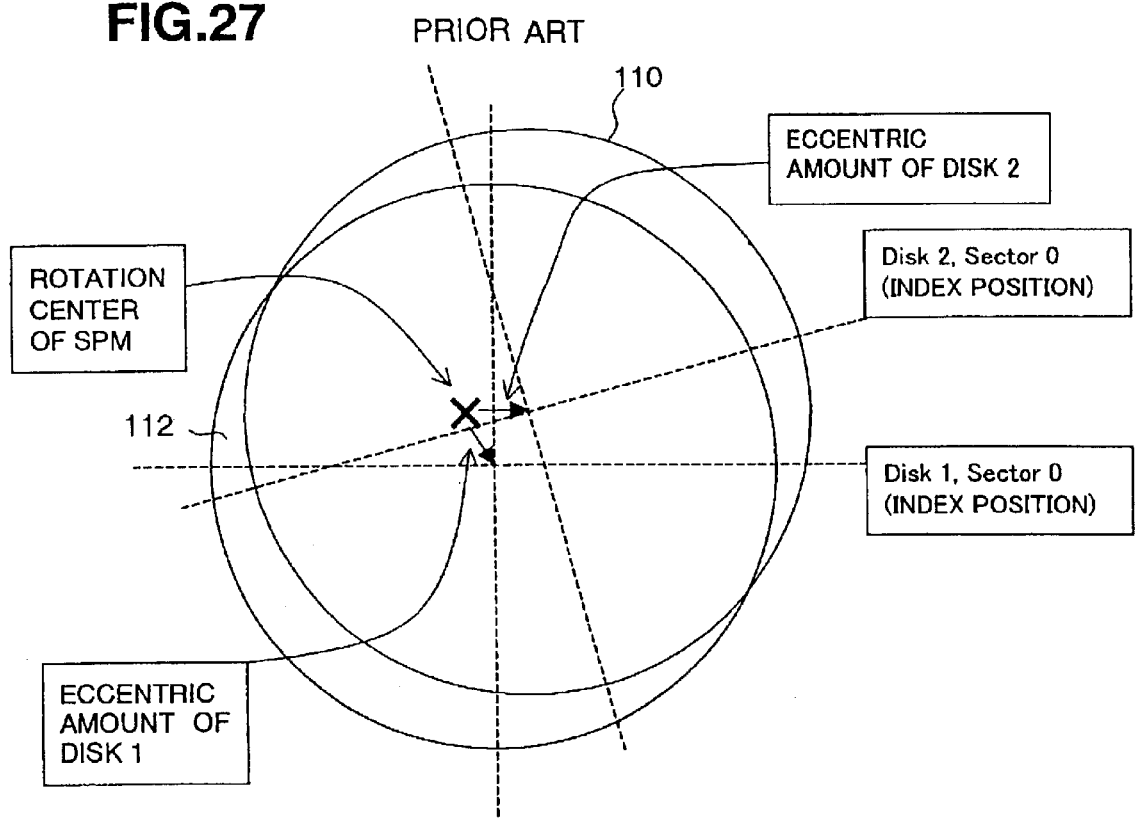
FIG. 27 is an illustrative diagram of eccentric misalignment between magnetic disks.
Figure 28:
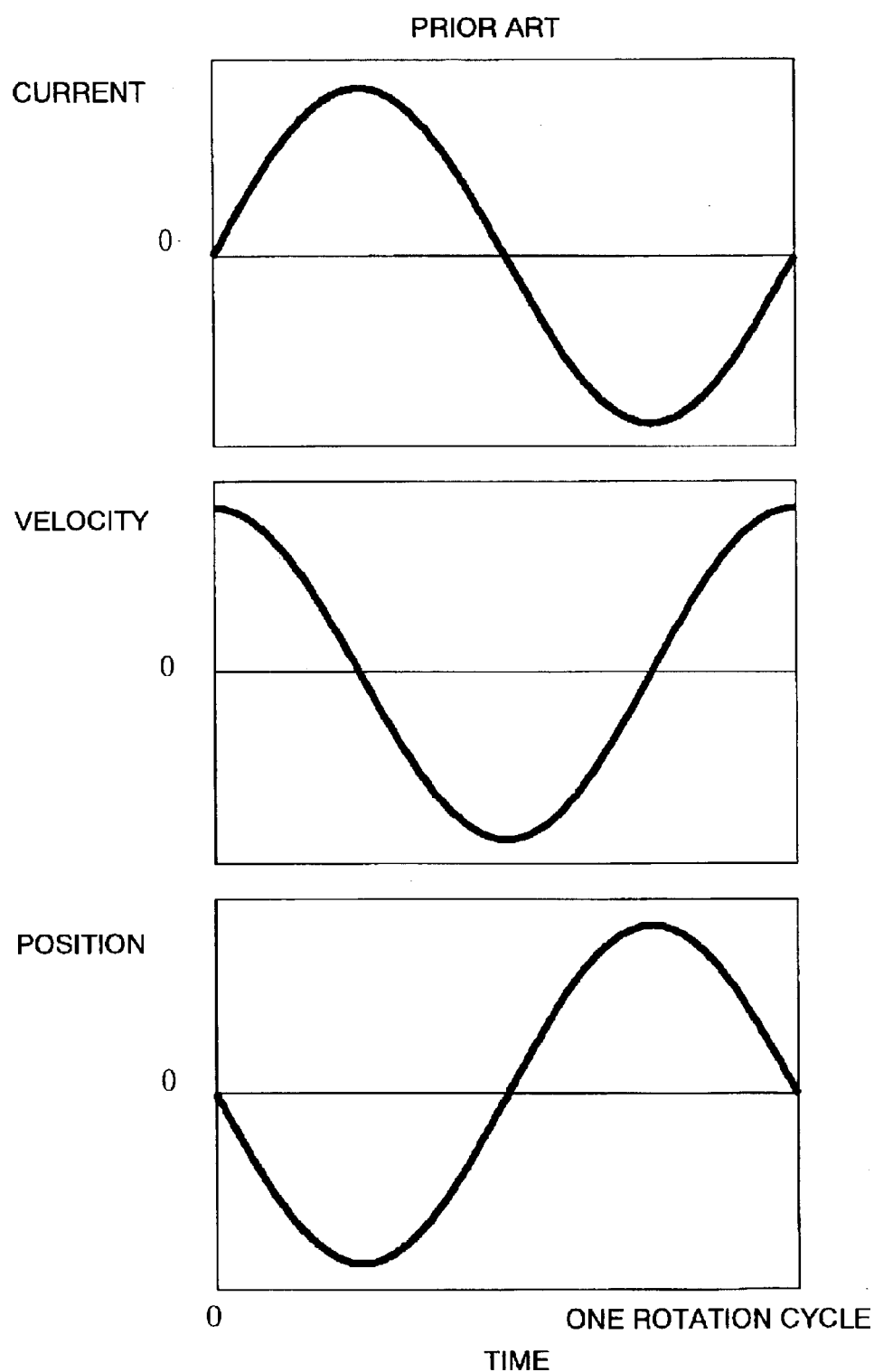
FIG. 28 is an illustrative diagram of eccentricity correction current and the operation of an actuator.

FIG. 24 and FIG. 25 show the shape of a further current for correcting step differentials in the eccentricity correction currents. Rather than triangular, the shape of this correction current may instead be a power function, such as a secondary function or tertiary function as illustrated in FIG. 24, or a sinusoidal wave as illustrated in FIG. 25.

As described above, the disk storage device is a magnetic disk device, but the present invention is also applicable to other types of disk storage devices, such as an optical disk device, magneto-optical disk device, or the like. Moreover, the correction method for switching heads may also be used for switching between heads on the front and rear faces of the same disk, and is not limited to a device containing two or more disks. Moreover, the shape of the disk is not limited to being circular, but may also have a card shape, for example.

The present invention has been described with reference to specific embodiments, but one skilled in the art will understand that various modifications are possible within the scope of the present invention, and that these modifications are not excluded from the technical scope of the present invention.

As described above, according to the present invention, when there is a differential between the eccentric trajectories of two heads, then the following beneficial effects can be obtained.

(1) Since the initial velocity at head switching is supplied to the controller and the disparity in the response is improved, it is possible to shorten the seek time.

(2) Since a trajectory for correcting the initial velocity at switching is supplied, it is possible to shorten the seek time.

(3) Since switching step differential in the eccentricity correction current is eliminated when switching heads, it is possible to eliminate residual oscillation accompanying the step differential, and hence the seek time can be further shortened.

What is claimed is:

1. A head position control method for driving a plurality of heads by means of a single actuator in order to at least read different disk surfaces, comprising the steps of:

calculating a servo control amount in accordance with a positional error between a target position of a selected one of the plurality of heads and a present position of said selected head;

controlling the actuator by adding an eccentricity correction current corresponding to said selected head to said servo control amount;

calculating, when switching from one of the plurality of heads to another of the plurality of heads, a differential velocity between eccentric trajectories of said respective switched heads before and after switching; and setting said differential velocity as an initial velocity in said step of calculating said servo control amount.

2. The head position control method according to claim 1, wherein said step of calculating said differential velocity comprises a step for calculating said differential velocity on the basis of a difference between an eccentricity correction current for said one of the plurality of heads and an eccentricity correction current for said another of said plurality of heads.

3. A head position control method for driving a plurality of heads by means of a single actuator in order to at least read different disk surfaces, comprising the steps of:

calculating a servo control amount in accordance with a positional error between a target position of a selected one of the plurality of heads and a present position of said selected head;

controlling the actuator by adding an eccentricity correction current corresponding to said selected head to said servo control amount;

calculating, when switching from one of the plurality of heads to another of the plurality of heads, a differential velocity between eccentric trajectories of said respective switched heads before and after switching; and performing feed forward control for reducing said differential velocity.

4. The head position control method according to claim 3, wherein said feed forward control step comprises the steps of:

generating a position trajectory and current trajectory for reducing said differential velocity, in accordance with said differential velocity;

correcting said present position by means of said position trajectory; and adding said current trajectory to said eccentricity correction current and supplying said added result to the actuator.

5. A head position control method for driving a plurality of heads by means of a single actuator in order to at least read different disk surfaces, comprising the steps of:

calculating a servo control amount in accordance with a positional error between a target position of a selected one of the plurality of heads and a present position of said selected head;

controlling the actuator by adding an eccentricity correction current corresponding to said selected head to said servo control amount;

calculating, when switching from one of said plurality of heads to another of said plurality of heads, a differential between eccentricity correction currents of said respective switched heads before and after switching; and performing feed forward control for reducing said differential.

6. The head position control method according to claim 5, wherein said feed forward control step comprises the steps of:

generating a position trajectory and current trajectory for reducing said current differential, in accordance with said current differential;

correcting said present position by means of said position trajectory; and adding said current trajectory to said eccentricity correction current and supplying said added result to the actuator.

7. A head position control method for driving a plurality of heads by means of a single actuator in order to at least read different disk surfaces, comprising the steps of:

calculating a servo control amount in accordance with a positional error between a target position of a selected one of the plurality of heads and a present position of said selected head;

controlling said actuator by adding an eccentricity correction current corresponding to said selected head to said servo control amount;

calculating, when switching from one of said plurality of heads to another of said plurality of heads, a differential between eccentricity correction currents of said respective switched heads before and after said switching, and a velocity differential between said respective switched heads; and performing feed forward control for reducing said current differential and said velocity differential.

8. The head position control method according to claim 7, wherein said feed forward control step comprises the steps of:

generating a first position trajectory and a first current trajectory for reducing said velocity differential, in accordance with said velocity differential;

generating a second position trajectory and a second current trajectory for reducing said current differential, in accordance with said current differential;

correcting said present position by means of said first and second position trajectories; and adding said first and second current trajectories to said eccentricity correction current and supplying said added result to the actuator.

9. A disk storage device, comprising:

a plurality of heads for at least reading different disk surfaces;

a single actuator for driving said plurality of heads; and a controller for performing servo control in accordance with a positional error between a target position of a selected one of said plurality of heads and a present position of said selected head, and controlling said actuator by adding an eccentricity correction current corresponding to said selected head to said servo control amount, wherein, when switching from one of said plurality of heads to another of said plurality of heads, said controller calculates a differential velocity between eccentric trajectories of said respective switched heads before and after switching, and sets said differential velocity as an initial velocity in a calculation of said servo amount.

10. The disk storage device according to claim 9, wherein said controller calculates said differential velocity on the basis of a difference between an eccentricity correction current for said one of said plurality of heads and an eccentricity correction current for said another of said plurality of heads.

11. A disk storage device comprising:

a plurality of heads for at least reading different disk surfaces;

a single actuator for driving said plurality of heads; and a controller for performing servo control in accordance with a positional error between a target position of a selected one of said plurality of heads and a present position of said selected head, and controlling said actuator by adding an eccentricity correction current corresponding to said selected head to said servo control amount;

wherein, when switching from one of said plurality of heads to another of said plurality of heads, said controller calculates a differential velocity between eccentric trajectories of said respective switched heads before and after switching and performs feed forward control for reducing said differential velocity.

12. The disk storage device according to claim 11, wherein said controller generates a position trajectory and current trajectory for reducing said differential velocity, in accordance with said differential velocity, corrects said present position by means of said position trajectory, adds said current trajectory to said eccentricity correction current, and supplies said added result to said actuator.

13. A disk storage device comprising:

a plurality of heads for at least reading different disk surfaces;

a single actuator for driving said plurality of heads; and a controller for performing servo control in accordance with a positional error between a target position of a selected one of said plurality of heads and a present position of said selected head, and controlling said actuator by adding an eccentricity correction current corresponding to said selected head to said servo control amount;

wherein, when switching from one of said plurality of heads to another of said plurality of heads, said controller calculates a differential between eccentricity correction currents of said respective switched heads before and after switching and performs feed forward control for reducing said differential.

14. The disk storage device according to claim 13, wherein said controller generates a position trajectory and a current trajectory for reducing said current differential, corrects said present position by means of said position trajectory, adds said current trajectory to said eccentricity correction current, and supplies said added result to said actuator.

15. A disk storage device comprising:

a plurality of heads for at least reading different disk surfaces;

a single actuator for driving said plurality of heads; and a controller for performing servo control in accordance with a positional error between a target position of a selected one of said plurality of heads and a present position of said selected head, and controlling said actuator by adding an eccentricity correction current corresponding to said selected head to said servo control amount;

wherein, when switching from one of said plurality of heads to another of said plurality of heads, said controller calculates a differential between eccentricity correction currents of said respective switched heads before and after switching, and a velocity differential between said heads, and performs feed forward control for reducing said current differential and said velocity differential.

16. The disk storage device according to claim 15, wherein said controller generates a first position trajectory and a first current trajectory for reducing said velocity differential in accordance with said velocity differential, generates a second position trajectory and a second current trajectory for reducing said current differential in accordance with said current differential, corrects said present position by means of said first and second position trajectories, and adds said first and second current trajectories to said eccentricity correction current and supplies added result to said actuator.

* * * * *